(12) United States Patent
Thompson et al.

(10) Patent No.: US 11,633,985 B2
(45) Date of Patent: Apr. 25, 2023

(54) WHEEL COMPRISING A NON-PNEUMATIC TIRE

(71) Applicant: CAMSO INC., Magog (CA)

(72) Inventors: Ronald H. Thompson, Greenville, SC (US); Marc Favre, Plattsburgh, NY (US)

(73) Assignee: CAMSO INC., Magog (CA)

( * ) Notice: Subject to any disclaimer, the term of this patent is extended or adjusted under 35 U.S.C. 154(b) by 422 days.

(21) Appl. No.: 16/470,448

(22) PCT Filed: May 30, 2017

(86) PCT No.: PCT/US2017/035008
§ 371 (c)(1),
(2) Date: Jun. 17, 2019

(87) PCT Pub. No.: WO2018/111339
PCT Pub. Date: Jun. 21, 2018

(65) Prior Publication Data
US 2020/0009916 A1    Jan. 9, 2020

Related U.S. Application Data

(63) Continuation-in-part of application No. PCT/US2016/067260, filed on Dec. 16, 2016.

(51) Int. Cl.
*B60C 7/18* (2006.01)
*B60C 7/10* (2006.01)

(52) U.S. Cl.
CPC ............... *B60C 7/18* (2013.01); *B60C 7/107* (2021.08); *B60C 2200/065* (2013.01); *B60C 2200/08* (2013.01)

(58) Field of Classification Search
CPC .... B60C 7/00; B60C 7/10; B60C 7/22; B60C 2007/107; B60C 2007/146
See application file for complete search history.

(56) References Cited

U.S. PATENT DOCUMENTS

| 8,517,068 B2 | 8/2013 | Delfino et al. |
| 2002/0096237 A1 | 7/2002 | Burhoe et al. |

(Continued)

FOREIGN PATENT DOCUMENTS

WO    2016126983 A1    8/2016

OTHER PUBLICATIONS

International Search Report for International Application PCT/US2016/067260, dated Mar. 31, 2017, 5 pages.

(Continued)

*Primary Examiner* — Justin R Fischer
(74) *Attorney, Agent, or Firm* — Hahn Loeser & Parks LLP; Bret A. Hrivnak

(57) ABSTRACT

A wheel for a vehicle (e.g., a construction vehicle, an all-terrain vehicle, or other off-road vehicle) or other device, in which the wheel comprises a non-pneumatic tire and may be designed to enhance its use and performance and/or use and performance of the vehicle or other device, including, for example, to be able to be used longer and/or in more challenging conditions, such as, for instance, by being more thermally efficient (e.g., to avoid or reduce adverse effects such as rapid degradation in material properties that could otherwise arise due to excessive temperatures) and/or more resistant to cracking or other damage which could lead to premature failure (e.g., due to manufacturing artifacts and/or rocks and other hazards that can cut, chip, or tear it during use).

21 Claims, 30 Drawing Sheets

(56) References Cited

U.S. PATENT DOCUMENTS

| | | |
|---|---|---|
| 2010/0193097 A1 | 8/2010 | Mcnier et al. |
| 2011/0030866 A1* | 2/2011 | Fadel ........................ B60C 7/18 |
| | | 152/311 |
| 2012/0193004 A1 | 8/2012 | Anderson et al. |
| 2013/0233458 A1 | 9/2013 | Meraldi et al. |
| 2014/0238561 A1 | 8/2014 | Choi et al. |
| 2014/0326374 A1 | 11/2014 | Cron et al. |
| 2014/0367007 A1 | 12/2014 | Thompson |
| 2015/0343845 A1 | 12/2015 | Kinney et al. |

OTHER PUBLICATIONS

International Search Report for International Application PCT/US2017/035008, dated Oct. 16, 2017, 4 pages.

\* cited by examiner $T_S$ Wall Surface Temperature:

$$T_S = \frac{\dot{q}t}{2h} + T_\infty$$

$T_{max}$ at Center of Wall:

$$T_{max} = \dot{q}\frac{t^2}{8k} + T_S$$

$\dot{q}$ = Internal Heat Generation
$h$ = Wall Convection Coefficient
$T_\infty$ = Ambient Temperature
$K$ = Wall Thermal Conductivity Central wall in the web structure

WHEEL COMPRISING A NON-PNEUMATIC TIRE

FIELD

The invention generally relates to wheels comprising non-pneumatic tires (NPTs), such as for vehicles (e.g., industrial vehicles such as construction vehicles; all-terrain vehicles (ATVs); agricultural vehicles; automobiles and other road vehicles; etc.) and/or other devices.

BACKGROUND

Wheels for vehicles and other devices may comprise non-pneumatic tires (sometimes referred to as NPTs) instead of pneumatic tires.

Pneumatic tires are market leaders across a wide variety of size, speed, and load requirements. For example, radial pneumatic tires are found on automotive tires of 0.6 meter diameter that carry 0.5 metric tons, and also on tires used in mining operations of 4 meter diameter that carry 50 metric tons. Pneumatic tires are thus scalable.

A pneumatic tire owes its scalability, in part, to that fact that it is a pre-tensioned structure. When displaced against a flat surface, changes in carcass ply tension and deflections of the carcass ply create a vertical reaction force. Also, due to the presence of this reinforcement, the stresses in elastomer material of the tire can be small, as can the thickness of the elastomer layers.

Rubber thicknesses in a pneumatic tire are typically small compared to the radius of the tire. A passenger car tire of 300 mm radius may have a sidewall that is 6 mm thick. The tread thickness of passenger car tire is about 12 mm. Thus, a ratio of sidewall thickness and tread thickness to tire diameter is about 1% and 2% respectively. Large tires for construction and earth moving roughly keep this relationship. Tire thickness increases proportionately with the overall tire size.

This is key for the scalability of pneumatic tires. Elastomers are good insulators, and they generate heat energy under cyclic deformation. Added to this, elastomer properties typically decline as temperature increases. Taken together, this creates a major challenge for tire design. Thanks to the ability of the pneumatic tire to utilize relatively thin rubber products, and the fact that the vertical load is driven by pneumatic pretension, scalability is more easily accomplished.

Pneumatic tires, however, have disadvantages due to their reliance on inflation pressure. First, function is reduced when pressure is reduced; second, they fail inoperably when inflation pressure is lost; and third, the stored energy of inflation creates a safety hazard.

In automotive use, these disadvantages are mitigated by use of pressure monitoring devices, the fact that these tires are used on improved roads, and because the stored energy is relatively small for automotive sized tires.

Off-road use of pneumatic tires, such as for large construction, mining or other industrial vehicles, may be more penalizing. Off-road conditions are more hazardous to tire integrity, leading to more frequent tire damage. Additionally, the stored energy of a pneumatic tire goes with the air volume times inflation pressure. As the tire width is generally a percentage of the radius, air volume increases as radius to the third power. The stored energy of a pneumatic tire inflated to 7 bar (100 psi) of 3 meter diameter tire is tremendous. The explosive potential may correspond to that of a stick of dynamite. Not surprisingly, each year in North America, several people are killed or seriously injured due to explosions of large off-road tires used in mining and construction industries.

Non-pneumatic tires are used in certain applications. They are sometimes used in highly aggressive environments where flats are a problem for pneumatic tires. NPTs are not inflated and have no gas-filled bladder like a pneumatic tire. A non-pneumatic tire therefore escapes the performance problems of inflation—loss of function due to flats and the hazards of inflation due to stored energy.

Yet, this advantage of NPTs usually comes with trade-offs or compromises. For example, NPTs may be heavier, generate more heat, be susceptible to other modes of failure (e.g., by crack propagation), and/or be more complex and expensive to manufacture.

For instance, in some cases, such as in construction vehicles, a non-pneumatic tire may need to have thermal and structural equilibrium while carrying large loads at even moderate speeds, while using a compliant tire structure.

NPTs may also sometimes be too heavy for some applications. For example, certain original equipment manufacturers (OEMs) in industrial sectors may sometimes have to pass roll-over tests in vehicle certification. Protective roll-over cages must be able to withstand the vehicle weight as well as the weight of the tires, in case of a roll-over event. In the 20.5×25 tire size—a size used for common front end loaders—the pneumatic tire/wheel assembly weight is around 680 lbs. Current non-pneumatic tires on the market in this size may weigh around 2000 lbs. This adds about 5280 lbs (2400 kgf) to the amount of weight that must be supported by the cab during roll-over. This may be outside OEM specifications such that current NPTs, therefore, may not be used as original equipment.

Existing NPTs may also be expensive. Notably, current large non-pneumatic "solid" tires used in some construction applications may be expensive. For instance, a solid NPT comparable to a 20.5×25 pneumatic tire may cost as much as $8,000 compared to $5000 for the pneumatic tires, due to its high weight and therefore higher material cost. Such solid tires see limited use, do to their high stiffness, high weight, and high cost.

For these and other reasons, there is a need to improve wheels comprising non-pneumatic tires.

SUMMARY

According to various aspects of the invention, there is provided a wheel for a vehicle or other device, in which the wheel comprises a non-pneumatic tire and may be designed to enhance its use and performance and/or use and performance of the vehicle or other device, including, for example, to be able to be used longer and/or in more challenging conditions, such as, for instance, by being more thermally efficient (e.g., to avoid or reduce adverse effects such as rapid degradation in material properties that could otherwise arise due to excessive temperatures) and/or more resistant to cracking or other damage which could lead to premature failure (e.g., due to manufacturing artifacts and/or rocks and other hazards that can cut, chip, or tear it during use).

For example, according to an aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. A ratio of a volume of the annular beam and the annular support over a surface area of the annular beam and the annular support is no more than 20 mm³/mm².

According to another aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. A ratio of a volume of the annular beam over a surface area of the annular beam is no more than 12 mm³/mm².

According to another aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. A ratio of a maximal wall thickness of the annular beam and the annular support over a diameter of the wheel is no more than 5%.

According to another aspect of the invention, there is provided a non-pneumatic tire for a wheel. The non-pneumatic tire comprises an annular beam configured to deflect at a contact patch of the non-pneumatic tire. The annular beam comprises a plurality of openings distributed in a circumferential direction of the non-pneumatic tire. An openness factor of the annular beam is at least 0.4. The non-pneumatic tire comprises an annular support disposed radially inwardly of the annular beam and configured to resiliently deform as the wheel engages the ground.

According to another aspect of the invention, there is provided a non-pneumatic tire for a wheel. The non-pneumatic tire comprises an annular beam configured to deflect at a contact patch of the non-pneumatic tire. The annular beam comprises a plurality of openings distributed in a circumferential direction of the non-pneumatic tire. A cross-section of each opening varies in an axial direction of the non-pneumatic tire. The non-pneumatic tire comprises an annular support disposed radially inwardly of the annular beam and configured to resiliently deform as the wheel engages the ground.

According to another aspect of the invention, there is provided a non-pneumatic tire for a wheel. The non-pneumatic tire comprises an annular beam configured to deflect at a contact patch of the non-pneumatic tire. The annular beam comprises a plurality of openings distributed in a circumferential direction of the non-pneumatic tire. Each opening is configured such that an airflow path within the opening is transversal to an axial direction of the non-pneumatic tire. The non-pneumatic tire comprises an annular support disposed radially inwardly of the annular beam and configured to resiliently deform as the wheel engages the ground.

According to another aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. The non-pneumatic tire comprises a first material and a second material more resistant to crack propagation than the first material.

According to another aspect of the invention, there is provided a non-pneumatic tire for a wheel. The non-pneumatic tire comprises an annular beam configured to deflect at a contact patch of the non-pneumatic tire, and a plurality of spokes disposed radially inwardly of the annular beam and configured to resiliently deform as the wheel engages the ground. Each spoke comprises a stress reducer.

According to another aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. A surface roughness of at least a portion of a periphery of the non-pneumatic tire is no more than 2 µm.

According to another aspect of the invention, there is provided a non-pneumatic tire for a wheel. The non-pneumatic tire comprises an annular beam configured to deflect at a contact patch of the non-pneumatic tire, and an annular support disposed radially inwardly of the annular beam and configured to resiliently deform as the wheel engages the ground. A first portion of a periphery of the non-pneumatic tire is more susceptible to crack propagation than a second portion of the periphery of the non-pneumatic tire, and a surface roughness of the first portion of the periphery of the non-pneumatic tire is less than a surface roughness of the second portion of the periphery of the non-pneumatic tire.

According to another aspect of the invention, there is provided a non-pneumatic tire for a wheel. The non-pneumatic tire comprises an annular beam configured to deflect at a contact patch of the non-pneumatic tire. The annular beam is configured to deflect more by shearing than by bending at the contact patch of the non-pneumatic tire. The annular beam comprises a reinforcing layer running in a circumferential direction of the non-pneumatic tire. The reinforcing layer is unnecessary for the annular beam to deflect more by shearing than by bending at the contact patch of the non-pneumatic tire. The non-pneumatic tire comprises an annular support disposed radially inwardly of the annular beam and configured to resiliently deform as the wheel engages the ground.

According to another aspect of the invention, there is provided a non-pneumatic tire for a wheel. The non-pneumatic tire comprises an annular beam configured to deflect at a contact patch of the non-pneumatic tire. The annular beam comprises a reinforcing layer running in a circumferential direction of the non-pneumatic tire. The non-pneumatic tire comprises an annular support disposed radially inwardly of the annular beam and configured to resiliently deform as the wheel engages the ground. The annular beam is free of any equivalent reinforcing layer running in the circumferential direction of the non-pneumatic tire and spaced from the reinforcing layer in a radial direction of the non-pneumatic tire.

According to another aspect of the invention, there is provided a non-pneumatic tire for a wheel. The non-pneumatic tire comprises an annular beam configured to deflect at a contact patch of the non-pneumatic tire. The annular beam comprises a reinforcing layer running in a circumferential direction of the non-pneumatic tire. The non-pneumatic tire comprises an annular support disposed radially inwardly of the annular beam and configured to resiliently deform as the wheel engages the ground. The reinforcing layer is located between a neutral axis of the annular beam and a given one of an inner peripheral extent and an outer peripheral extent of the annular beam in a radial direction of the non-pneumatic tire. The annular beam is free of any substantially inextensible reinforcing layer running in the circumferential direction of the non-pneumatic tire between the neutral axis of the annular beam and the other one of the inner peripheral extent and the outer peripheral extent of the annular beam in the radial direction of the non-pneumatic tire.

According to another aspect of the invention, there is provided a non-pneumatic tire for a wheel. The non-pneumatic tire comprises an annular beam configured to deflect at a contact patch of the non-pneumatic tire. The annular beam comprises an outer rim, an inner rim, and a plurality of openings between the outer rim and the inner rim. A ratio of a thickness of the annular beam in a radial direction of the non-pneumatic tire over a diameter of the wheel is at least 5%. The non-pneumatic tire comprises an annular support disposed radially inwardly of the annular beam and configured to resiliently deform as the wheel engages the ground.

According to another aspect of the invention, there is provided a non-pneumatic tire for a wheel. The non-pneumatic tire comprises an annular beam configured to deflect at a contact patch of the non-pneumatic tire. The annular beam comprises an outer rim, an inner rim, and a plurality of openings between the outer rim and the inner rim. The inner rim is thicker than the outer rim in a radial direction of the non-pneumatic tire. The non-pneumatic tire comprises an annular support disposed radially inwardly of the annular beam and configured to resiliently deform as the wheel engages the ground.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
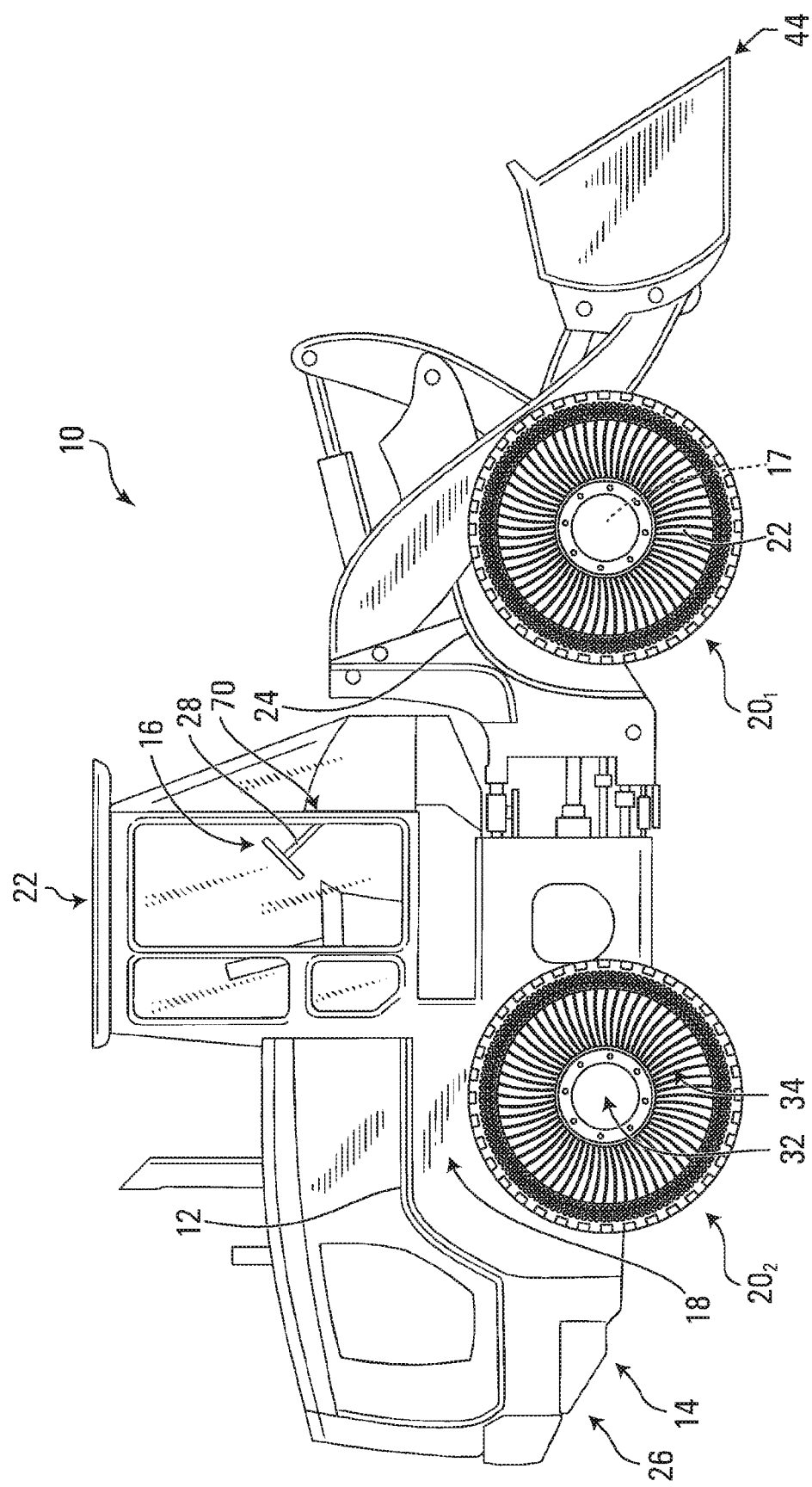
FIG. 1 shows an example of a vehicle comprising wheels comprising non-pneumatic tires in accordance with an embodiment of the invention.

FIG. 1 shows an example of a vehicle 10 comprising wheels $20_1$-$20_4$ in accordance with an embodiment of the invention. In this embodiment, the vehicle 10 is an industrial vehicle. The industrial vehicle 10 is a heavy-duty vehicle designed to travel off-road to perform industrial work using a work implement 44. In this embodiment, the industrial vehicle 10 is a construction vehicle for performing construction work using the work implement 44. More particularly, in this embodiment, the construction vehicle 10 is a loader (e.g., a skid-steer loader). The construction vehicle 10 may be a bulldozer, a backhoe loader, an excavator, a dump truck, or any other type of construction vehicle in other embodiments. In this example, the construction vehicle 10 comprises a frame 12, a powertrain 14, a steering system 16, a suspension 18, the wheels $20_1$-$20_4$, and an operator cabin 22, which enable a user, i.e., an operator, of the construction vehicle 10 to move the vehicle 10 on the ground and perform work using the work implement 44. The construction vehicle 10 has a longitudinal direction, a widthwise direction, and a height direction.

In this embodiment, as further discussed later, the wheels $20_1$-$20_4$ are non-pneumatic (i.e., airless) and may be designed to enhance their use and performance and/or use and performance of the construction vehicle 10, including, for example, to be able to be used longer and/or in more challenging conditions, such as, for instance, by being more thermally efficient (e.g., to avoid or reduce adverse effects such as rapid degradation in material properties that could otherwise arise due to excessive temperatures) and/or more resistant to cracking or other damage which could lead to premature failure (e.g., due to manufacturing artifacts and/or rocks and other hazards that can cut, chip, or tear them during use).

The powertrain 14 is configured for generating motive power and transmitting motive power to respective ones of the wheels $20_1$-$20_4$ to propel the construction vehicle 10 on the ground. To that end, the powertrain 14 comprises a prime mover 26, which is a source of motive power that comprises one or more motors. For example, in this embodiment, the prime mover 26 comprises an internal combustion engine. In other embodiments, the prime mover 26 may comprise another type of motor (e.g., an electric motor) or a combination of different types of motor (e.g., an internal combustion engine and an electric motor). The prime mover 26 is in a driving relationship with one or more of the wheels $20_1$-$20_4$. That is, the powertrain 14 transmits motive power generated by the prime mover 26 to one or more of the wheels $20_1$-$20_4$ (e.g., via a transmission and/or a differential) in order to drive (i.e., impart motion to) these one or more of the wheels $20_1$-$20_4$.

The steering system 16 is configured to enable the operator to steer the construction vehicle 10 on the ground. To that end, the steering system 16 comprises a steering device 28 that is operable by the operator to direct the construction vehicle 10 along a desired course on the ground. The steering device 28 may comprise a steering wheel or any other steering component (e.g., a joystick) that can be operated by the operator to steer the construction vehicle 10. The steering system 16 responds to the operator interacting with the steering device 28 by turning respective ones of the wheels $20_1$-$20_4$ to change their orientation relative to part of the frame 12 of the construction vehicle 10 in order to cause the vehicle 10 to move in a desired direction. In this example, a front frame member 231 carrying front ones of the wheels $20_1$-$20_4$ is turnable in response to input of the operator at the steering device 28 to change its orientation and thus the orientation of the front ones of the wheels $20_1$-$20_4$ relative to a rear frame member 232 of the construction vehicle 10 in order to steer the vehicle 10 on the ground.

The suspension 18 is connected between the frame 12 and the wheels $20_1$-$20_4$ to allow relative motion between the frame 12 and the wheels $20_1$-$20_4$ as the construction vehicle 10 travels on the ground. For example, the suspension 18 may enhance handling of the construction vehicle 10 on the ground by absorbing shocks and helping to maintain traction between the wheels $20_1$-$20_4$ and the ground. The suspension 18 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

The operator cabin 22 is where the operator sits and controls the construction vehicle 10. More particularly, the operator cabin 22 comprises a user interface 70 including a set of controls that allow the operator to steer the construction vehicle 10 on the ground and operate the work implement 44. The user interface 70 also comprises an instrument panel (e.g., a dashboard) which provides indicators (e.g., a speedometer indicator, a tachometer indicator, etc.) to convey information to the operator.

The wheels $20_1$-$20_4$ engage the ground to provide traction to the construction vehicle 10. More particularly, in this example, the front ones of the wheels $20_1$-$20_4$ provide front traction to the construction vehicle 10 while the rear ones of the wheels $20_1$-$20_4$ provide rear traction to the construction vehicle 10.

Each wheel $20_i$ comprises a non-pneumatic tire 34 for contacting the ground and a hub 32 for connecting the wheel $20_i$ to an axle 17 of the construction vehicle 10. The non-pneumatic tire 34 is a compliant wheel structure that is not supported by gas (e.g., air) pressure and that is resiliently deformable (i.e., changeable in configuration) as the wheel $20_i$ contacts the ground.

Figure 2:
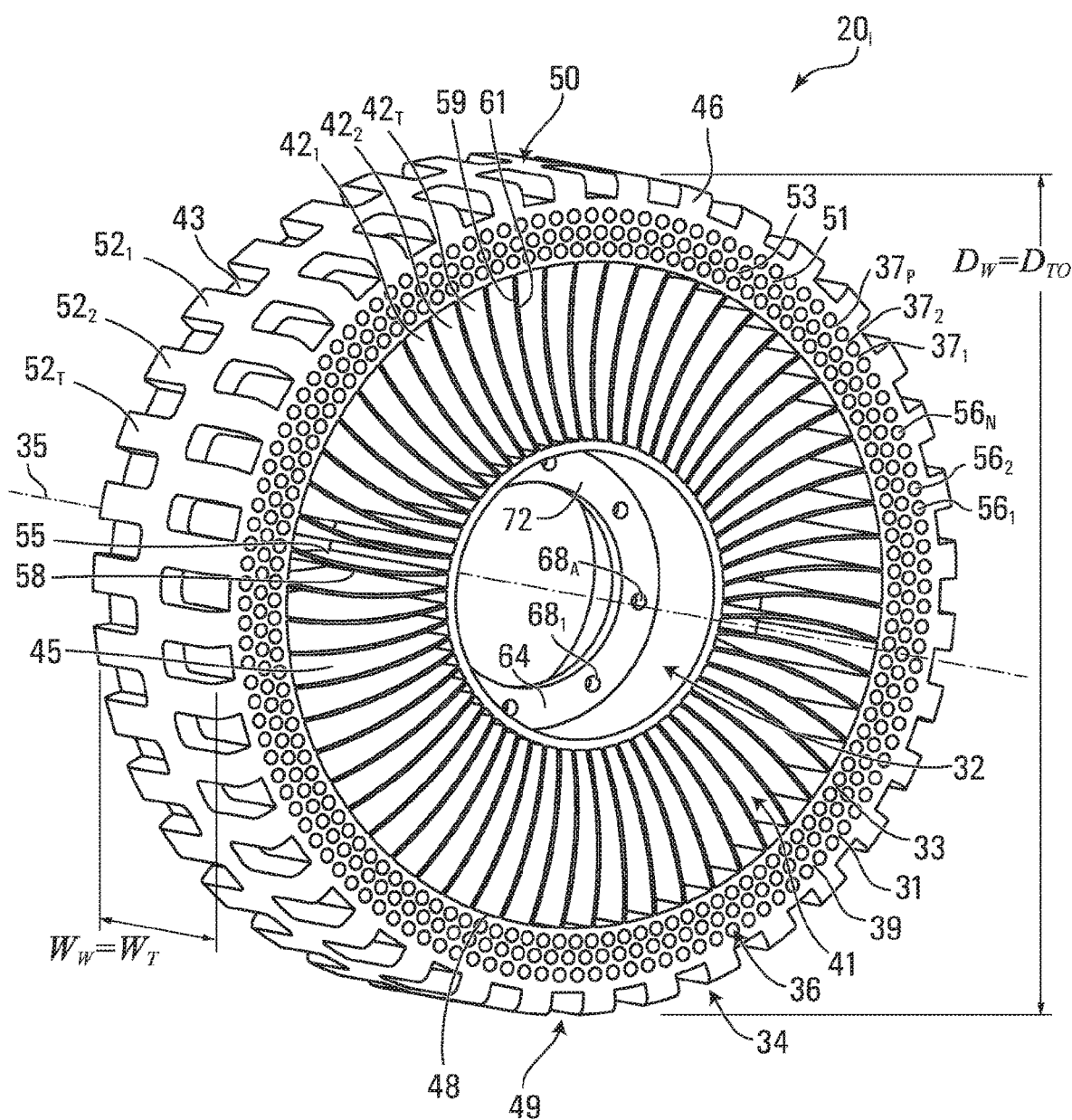
FIG. 2 shows a perspective view of a wheel comprising a non-pneumatic tire.
Figure 3:
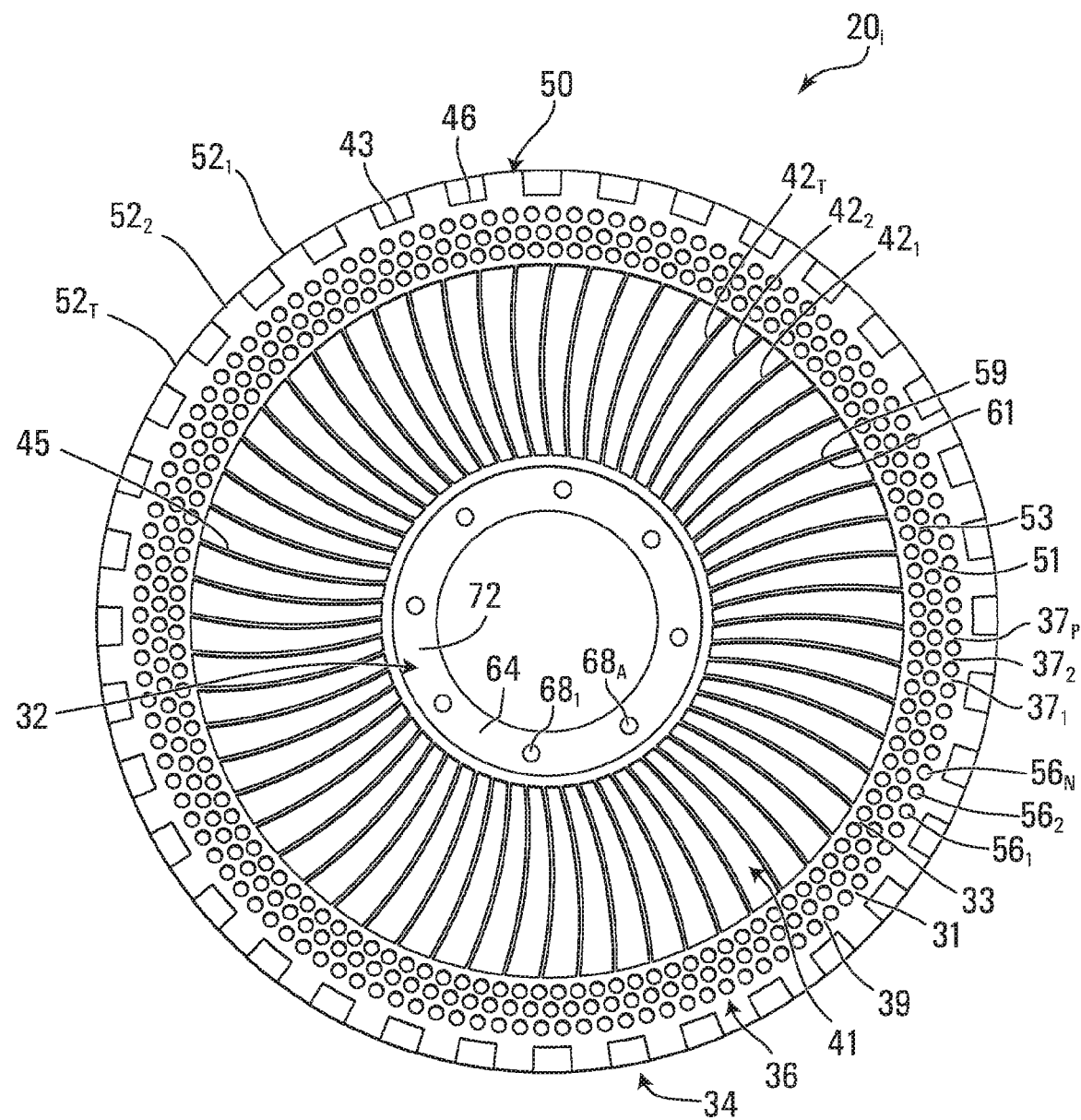
FIG. 3 shows a side-elevation view of the wheel.
Figure 4:
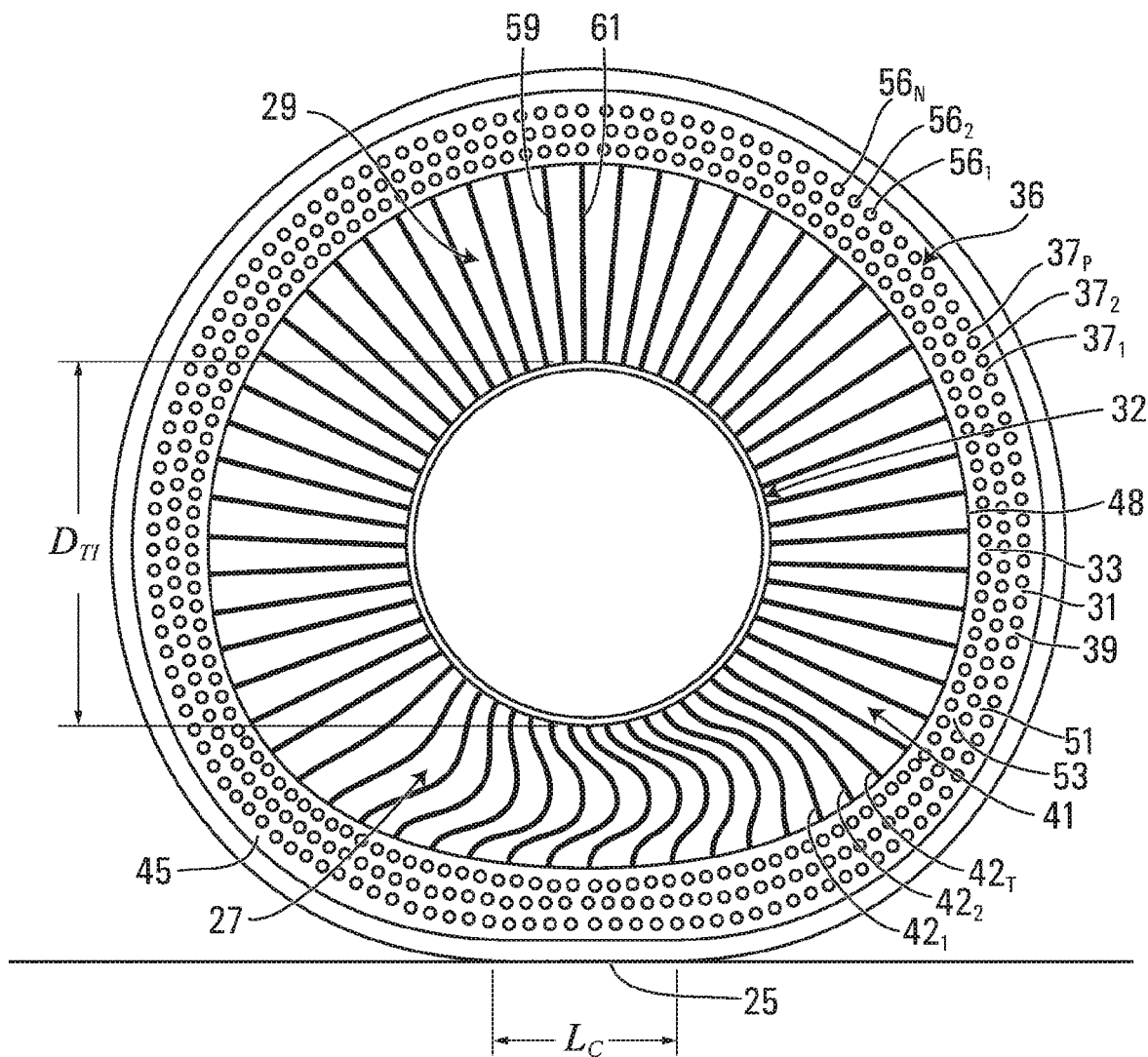
FIG. 4 shows a side-elevation view of the wheel when in loading conditions.

With additional reference to FIGS. 2 to 4, the wheel $20_i$ has an axial direction defined by an axis of rotation 35 of the wheel $20_i$ (also referred to as a "Y" direction), a radial direction (also referred to as a "Z" direction), and a circumferential direction (also referred to as a "X" direction). The wheel $20_i$ has an outer diameter $D_W$ and a width $W_W$.

It comprises an inboard lateral side 47 for facing a center of the construction vehicle 10 in the widthwise direction of the construction vehicle 10 and an outboard lateral side 49 opposite the inboard lateral side 47. As shown in FIG. 4, when it is in contact with the ground, the wheel $20_i$ has an area of contact 25 with the ground, which may be referred to as a "contact patch" of the wheel $20_i$ with the ground. The contact patch 25 of the wheel $20_i$, which is a contact interface between the non-pneumatic tire 34 and the ground, has a dimension $L_C$, referred to as a "length", in the circumferential direction of the wheel $20_i$ and a dimension $W_C$, referred to as a "width", in the axial direction of the wheel $20_i$.

The non-pneumatic tire 34 comprises an annular beam 36 and an annular support 41 that is disposed between the annular beam 36 and the hub 32 of the wheel $20_i$ and configured to support loading on the wheel $20_i$ as the wheel $20_i$ engages the ground. In this embodiment, the non-pneumatic tire 34 is tension-based such that the annular support 41 is configured to support the loading on the wheel $20_i$ by tension. That is, under the loading on the wheel $20_i$, the annular support 41 is resiliently deformable such that a lower portion 27 of the annular support 41 between the axis of rotation 35 of the wheel $20_i$ and the contact patch 25 of the wheel $20_i$ is compressed (e.g., with little reaction force vertically) and an upper portion 29 of the annular support 41 above the axis of rotation 35 of the wheel $20_i$ is in tension to support the loading.

The annular beam 36 of the tire 34 is configured to deflect under the loading on the wheel $20_i$ at the contact patch 25 of the wheel $20_i$ with the ground. For instance, the annular beam 36 functions like a beam in transverse deflection. An outer peripheral extent 46 of the annular beam 36 and an inner peripheral extent 48 of the annular beam 36 deflect at the contact patch 25 of the wheel $20_i$ under the loading on the wheel $20_i$. In this embodiment, the annular beam 36 is configured to deflect such that it applies a homogeneous contact pressure along the length $L_C$ of the contact patch 25 of the wheel $20_i$ with the ground.

More particularly, in this embodiment, the annular beam 36 comprises a shear band 39 configured to deflect predominantly by shearing at the contact patch 25 under the loading on the wheel $20_i$. That is, under the loading on the wheel $20_i$, the shear band 39 deflects significantly more by shearing than by bending at the contact patch 25. The shear band 39 is thus configured such that, at a center of the contact patch 25 of the wheel $20_i$ in the circumferential direction of the wheel $20_i$, a shear deflection of the shear band 39 is significantly greater than a bending deflection of the shear band 39. For example, in some embodiments, at the center of the contact patch 25 of the wheel $20_i$ in the circumferential direction of the wheel $20_i$, a ratio of the shear deflection of the shear band 39 over the bending deflection of the shear band 39 may be at least 1.2, in some cases at least 1.5, in some cases at least 2, in some cases at least 3, and in some cases even more (e.g., 4 or more). For instance, in some embodiments, the annular beam 36 may be designed based on principles discussed in U.S. Patent Application Publication 2014/0367007, which is hereby incorporated by reference herein, in order to achieve the homogeneous contact pressure along the length $L_C$ of the contact patch 25 of the wheel $20_i$ with the ground.

In this example of implementation, the shear band 39 comprises an outer rim 31, an inner rim 33, and a plurality of openings $56_1$-$56_N$ between the outer rim 31 and the inner rim 33. The shear band 39 comprises a plurality of interconnecting members $37_1$-$37_P$ that extend between the outer rim 31 and the inner rim 33 and are disposed between respective ones of the openings $56_1$-$56_N$. The interconnecting members $37_1$-$37_P$ may be referred to as "webs" such that the shear band 39 may be viewed as being "web-like" or "webbing". In this embodiment, the shear band 39 comprises intermediate rims 51, 53 between the outer rim 31 and the inner rim 33 such that the openings $56_1$-$56_N$ and the interconnecting members $37_1$-$37_P$ are arranged into three circumferential rows between adjacent ones of the rims 31, 51, 53, 33. The shear band 39, including the openings $56_1$-$56_N$ and the interconnecting members $37_1$-$37_P$, may be arranged in any other suitable way in other embodiments.

The openings $56_1$-$56_N$ of the shear band 39 help the shear band 39 to deflect predominantly by shearing at the contact patch 25 under the loading on the wheel $20_1$.

In this embodiment, the openings $56_1$-$56_N$ extend from the inboard lateral side 54 to the outboard lateral side 49 of the tire 34. That is, the openings $56_1$-$56_N$ extend laterally though the shear band 39 in the axial direction of the wheel $20_i$. The openings $56_1$-$56_N$ may extend laterally without reaching the inboard lateral side 54 and/or the outboard lateral side 49 of the tire 34 in other embodiments. The openings $56_1$-$56_N$ may have any suitable shape. In this example, a cross-section of each of the openings $56_1$-$56_N$ is circular. The cross-section of each of the openings $56_1$-$56_N$ may be shaped differently in other examples (e.g., polygonal, partly curved and partly straight, etc.). In some cases, different ones of the openings $56_1$-$56_N$ may have different shapes. In some cases, the cross-section of each of the openings $56_1$-$56_N$ may vary in the axial direction of the wheel $20_i$. For instance, in some embodiments, the openings $56_1$-$56_N$ may be tapered in the axial direction of the wheel $20_i$ such that their cross-section decreases inwardly axially (e.g., to help minimize debris accumulation within the openings $56_1$-$56_N$). Variation of the cross-section of each of the openings $56_1$-$56_N$ may also improve air flow through the openings $56_1$-$56_N$ in the lateral direction of the tire 34, due to the Venturi effect.

In this embodiment, the tire 34 comprises a tread 50 for enhancing traction between the tire 34 and the ground. The tread 50 is disposed about the outer peripheral extent 46 of the annular beam 36, in this case about the outer rim 31 of the shear band 39. More particularly, in this example the tread 50 comprises a tread base 43 that is at the outer peripheral extent 46 of the annular beam 36 and a plurality of tread projections $52_1$-$52_T$ that project from the tread base 52. The tread 50 may be implemented in any other suitable way in other embodiments (e.g., may comprise a plurality of tread recesses, etc.).

The annular support 41 is configured to support the loading on the wheel $20_i$ as the wheel $20_i$ engages the ground. As mentioned above, in this embodiment, the annular support 41 is configured to support the loading on the wheel $20_i$ by tension. More particularly, in this embodiment, the annular support 41 comprises a plurality of support members $42_1$-$42_T$ that are distributed around the tire 34 and resiliently deformable such that, under the loading on the wheel $20_i$, lower ones of the support members $42_1$-$42_T$ in the lower portion 27 of the annular support 41 (between the axis of rotation 35 of the wheel $20_i$ and the contact patch 25 of the wheel $20_i$) are compressed and bend while upper ones of the support members $42_1$-$42_T$ in the upper portion 29 of the annular support 41 (above the axis of rotation 35 of the wheel $20_i$) are tensioned to support the loading. As they support load by tension when in the upper portion 29 of the annular support 41, the support members $42_1$-$42_T$ may be referred to as "tensile" members.

In this embodiment, the support members $42_1$-$42_T$ are elongated and extend from the annular beam 36 towards the hub 32 generally in the radial direction of the wheel $20_i$. In that sense, the support members $42_1$-$42_T$ may be referred to as "spokes" and the annular support 41 may be referred to as a "spoked" support.

More particularly, in this embodiment, the inner peripheral extent 48 of the annular beam 36 is an inner peripheral surface of the annular beam 36 and each spoke $42_i$ extends from the inner peripheral surface 48 of the annular beam 36 towards the hub 32 generally in the radial direction of the wheel $20_i$ and from a first lateral end 55 to a second lateral end 58 in the axial direction of the wheel $20_i$. In this case, the spoke $42_i$ extends in the axial direction of the wheel $20_i$ for at least a majority of a width $W_T$ of the tire 34, which in this case corresponds to the width $W_W$ of the wheel $20_i$. For instance, in some embodiments, the spoke $42_i$ may extend in the axial direction of the wheel $20_i$ for more than half, in some cases at least 60%, in some cases at least 80%, and in some cases an entirety of the width $W_T$ of the tire 34. Moreover, the spoke $42_i$ has a thickness $T_S$ measured between opposite surfaces 59, 61 of the spoke $42_i$ that is significantly less than a length and width of the spoke $42_i$.

When the wheel $20_i$ is in contact with the ground and bears a load (e.g., part of a weight of the construction vehicle 10), respective ones of the spokes $42_1$-$42_T$ that are disposed in the upper portion 29 of the spoked support 41 (i.e., above the axis of rotation 35 of the wheel $20_i$) are placed in tension while respective ones of the spokes $42_1$-$42_T$ that are disposed in the lower portion 27 of the spoked support 41 (i.e., adjacent the contact patch 25) are placed in compression. The spokes $42_1$-$42_T$ in the lower portion 27 of the spoked support 41 which are in compression bend in response to the load. Conversely, the spokes $42_1$-$42_T$ in the upper portion 29 of the spoked support 41 which are placed in tension support the load by tension.

The tire 34 has an inner diameter $D_{TI}$ and an outer diameter $D_{TO}$, which in this case corresponds to the outer diameter $D_W$ of the wheel $20_i$. A sectional height $H_T$ of the tire 34 is half of a difference between the outer diameter $D_{TO}$ and the inner diameter $D_{TI}$ of the tire 34. The sectional height $H_T$ of the tire may be significant in relation to the width $W_T$ of the tire 34. In other words, an aspect ratio AR of the tire 34 corresponding to the sectional height $H_T$ over the width $W_T$ of the tire 34 may be relatively high. For instance, in some embodiments, the aspect ratio AR of the tire 34 may be at least 70%, in some cases at least 90%, in some cases at least 110%, and in some cases even more. Also, the inner diameter $D_{TI}$ of the tire 34 may be significantly less than the outer diameter $D_{TO}$ of the tire 34 as this may help for compliance of the wheel $20_i$. For example, in some embodiments, the inner diameter $D_{TI}$ of the tire 34 may be no more than half of the outer diameter $D_{TO}$ of the tire 34, in some cases less than half of the outer diameter $D_{TO}$ of the tire 34, in some cases no more than 40% of the outer diameter $D_{TO}$ of the tire 34, and in some cases even a smaller fraction of the outer diameter $D_{TO}$ of the tire 34.

The hub 32 is disposed centrally of the tire 34 and connects the wheel $20_i$ to the axle 17 of the construction vehicle 10. In this embodiment, the hub 32 comprises apertures $68_1$-$68_A$ defining a bolt pattern of the hub 32. The apertures $68_1$-$68_A$ allow a user to locate therein wheel studs (i.e., threaded fasteners) that typically project from a brake disk or a brake drum of the construction vehicle 10. A lug nut can be used to secure the hub 32 to each wheel stud in order to establish a fixed connection between the wheel $20_i$ and the axle 17 of the construction vehicle 10. The bolt pattern of the hub 32 (e.g., the number and/or positioning of apertures $68_1$-$68_A$) may be designed in any suitable way (e.g., dependent on the type, model and/or brand of the construction vehicle 10 to which the hub 32 is designed to fit). The hub 32 may be implemented in any other suitable manner in other embodiments (e.g., it may have any other suitable shape or design).

The wheel $20_i$ may be made up of one or more materials. The non-pneumatic tire 34 comprises a tire material 45 that makes up at least a substantial part (i.e., a substantial part or an entirety) of the tire 34. The hub 32 comprises a hub material 72 that makes up at least a substantial part of the hub 32. In some embodiments, the tire material 45 and the hub material 72 may be different materials. In other embodiments, the tire material 45 and the hub material 72 may be a common material (i.e., the same material).

In this embodiment, the tire material 45 constitutes at least part of the annular beam 36 and at least part of the spokes $42_1$-$42_T$. Also, in this embodiment, the tire material 45 constitutes at least part of the tread 50. More particularly, in this embodiment, the tire material 45 constitutes at least a majority (e.g., a majority or an entirety) of the annular beam 36, the tread 50, and the spokes $42_1$-$42_T$b. In this example of implementation, the tire material 45 makes up an entirety of the tire 34, including the annular beam 36, the spokes $42_1$-$42_T$, and the tread 50. The tire 34 is thus monolithically made of the tire material 45. In this example, therefore, the annular beam 36 is free of (i.e., without) a substantially inextensible reinforcing layer running in the circumferential direction of the wheel $20_i$ (e.g., a layer of metal, composite (e.g., carbon fibers, other fibers), and/or another material that is substantially inextensible running in the circumferential direction of the wheel $20_i$). In that sense, the annular beam 36 may be said to be "unreinforced".

The tire material 45 is elastomeric. For example, in this embodiment, the tire material 45 comprises a polyurethane (PU) elastomer. For instance, in some cases, the PU elastomer may be composed of a TDI pre-polymer, such as PET-95A, cured with MCDEA, commercially available from COIM. Other materials that may be suitable include using PET95-A or PET60D, cured with MOCA. Other materials available from Chemtura may also be suitable. These may include Adiprene E500X and E615X prepolymers, cured with C3LF or HQEE curative. Blends of the above prepolymers are also possible. Prepolymer C930 and C600, cured with C3LF or HQEE may also be suitable, as are blends of these prepolymers.

Polyurethanes that are terminated using MDI or TDI are possible, with ether and/or ester and/or polycaprolactone formulations, in addition to other curatives known in the cast polyurethane industry.

Other suitable resilient, elastomeric materials would include thermoplastic materials, such as HYTREL co-polymer, from DuPont, or thermoplastic polyurethanes such as Elastollan, from BASF. Materials in the 95 A to 60 D hardness level may be particularly useful, such as Hytrel 5556 and Elastollan 98A. Some resilient thermoplastics, such as plasticized nylon blends, may also be used. The Zytel line of nylons from DuPont may be particularly useful. The tire material 45 may be any other suitable material in other embodiments.

In this embodiment, the tire material 45 may exhibit a non-linear stress vs. strain behavior. For instance, the tire material 45 may have a secant modulus that decreases with increasing strain of the tire material 45. The tire material 45 may have a high Young's modulus that is significantly greater than the secant modulus at 100% strain (a.k.a. "the 100% modulus"). Such a non-linear behavior of the tire material 45 may provide efficient load carrying during normal operation and enable impact loading and large local deflections without generating high stresses. For instance, the tire material 45 may allow the tire 34 to operate at a low strain rate (e.g., 2% to 5%) during normal operation yet simultaneously allow large strains (e.g., when the construction vehicle 10 engages obstacles) without generating high stresses. This in turn may be helpful to minimize vehicle shock loading and enhance durability of the tire 34.

The tire 34 may comprise one or more additional materials in addition to the tire material 45 in other embodiments (e.g., different parts of the annular beam 36, different parts of the tread 50, and/or different parts of the spokes $42_1$-$42_T$ may be made of different materials). For example, in some embodiments, different parts of the annular beam 36, different parts of the tread 50, and/or different parts of the spokes $42_1$-$42_T$ may be made of different elastomers. As another example, in some embodiments, the annular beam 36 may comprise one or more substantially inextensible reinforcing layers running in the circumferential direction of the wheel $20_i$ (e.g., one or more layers of metal, composite (e.g., carbon fibers, other fibers), and/or another material that is substantially inextensible running in the circumferential direction of the wheel $20_i$).

In this embodiment, the hub material 72 constitutes at least part of the hub 32. More particularly, in this embodiment, the hub material 72 constitutes at least a majority (e.g., a majority or an entirety) of the hub 32. In this example of implementation, the hub material 72 makes up an entirety of the hub 32.

In this example of implementation, the hub material 72 is polymeric. More particularly, in this example of implementation, the hub material 72 is elastomeric. For example, in this embodiment, the hub material 72 comprises a polyurethane (PU) elastomer. For instance, in some cases, the PU elastomer may be PET-95A commercially available from COIM, cured with MCDEA.

The hub material 72 may be any other suitable material in other embodiments. For example, in other embodiments, the hub material 72 may comprise a stiffer polyurethane material, such as COIM's PET75D cured with MOCA. In some embodiments, the hub material 72 may not be polymeric. For instance, in some embodiments, the hub material 72 may be metallic (e.g., steel, aluminum, etc.).

The hub 32 may comprise one or more additional materials in addition to the hub material 72 in other embodiments (e.g., different parts of the hub 32 may be made of different materials).

For example, in some embodiments, for the annular beam 36, the spoked support 41, and the hub 32, various cast polyurethanes of either ether or ester systems may be used when appropriate (e.g., with alternative cure systems such as MOCA). In some examples, a shore hardness in the range of 90 A to 75 D and/or a Young's modulus between 40 MPA to 2000 MPa may be appropriate. The tread 50 may comprise rubber, cast polyurethane or any other suitable elastomer, and may have a Shore hardness of between 60 A to 85 A, with a Young's modulus between 3 MPa and 20 MPa.

In some embodiments the annular beam 36, the spoked support 41, and the hub 32 may comprise different materials. For example, the spoked support 41 may comprise a softer material (e.g., with a Young's modulus between 40 MPA to 100 MPA), the annular beam 36 may comprise a harder material (e.g., with modulus between 140 to 200 MPA) and the hub 32 may comprise a hardest material (e.g., with modulus between 300 to 2000 MPA).

The wheel $20_i$ may be manufactured in any suitable way. For example, in some embodiments, the tire 34 and/or the hub 32 may be manufactured via centrifugal casting, a.k.a. spin casting, which involves pouring one or more materials of the wheel $20_i$ into a mold that rotates about an axis. The material(s) is(are) distributed within the mold via a centrifugal force generated by the mold's rotation. In some cases, vertical spin casting, in which the mold's axis of rotation is generally vertical, may be used. In other cases, horizontal spin casting, in which the mold's axis of rotation is generally horizontal, may be used. The wheel $20_i$ may be manufactured using any other suitable manufacturing processes in other embodiments.

The NPT wheel $20_i$ may be lightweight. That is, a mass $M_W$ of the wheel $20_i$ may be relatively small. For example, in some embodiments, a ratio $M_{normalized}$ of the mass $M_W$ of the wheel $20_i$ in kilograms over the outer diameter $D_W$ of the wheel $20_i$ normalized by the width $W_W$ of the wheel $20_i$, $$M_{normalized} = \frac{\left(\frac{M_w}{D_w}\right)}{W_w}$$

may be no more than 0.0005 kg/mm², in some cases no more than 0.00040 kg/mm², in some cases no more than 0.0003 kg/mm², in some cases no more than 0.00020 kg/mm², in some cases no more than 0.00015 kg/mm², in some cases no more than 0.00013 kg/mm², in some cases no more than 0.00011 kg/mm², and in some cases even less (e.g., no more than 0.0001 kg/mm²).

For instance, in some embodiments, the outer diameter of the wheel $20_i$ may be 1.5 m, the width of the wheel $20_i$ may be about 0.5 m, and the mass $M_W$ of the wheel $20_i$ may be about 336 kg. The load capacity of the wheel $20_i$ may be about 10,000 kgf at 15 kph. The wheel $20_i$ may be a replacement for a 20.5"×25" pneumatic tire. Herein, a force or load may be expressed in units of kilogram-force (kgf), but this can be converted into other units of force (e.g., Newtons).

The wheel $20_i$, including the tire 34 and the hub 32, may have various features to enhance its use and performance and/or use and performance of the construction vehicle 10, including, for example, to be able to be used longer and/or in more challenging conditions, such as, for instance, by being more thermally efficient and/or more resistant to cracking or other damage which could lead to premature failure. This may be achieved in various ways in various embodiments, examples of which will now be discussed.

1. Enhanced Thermal Management

The wheel $20_i$ may be configured to be more thermally efficient, such as by generating less heat and/or dissipating heat more efficiently. This may help to maintain a temperature of wheel $20_i$ relatively low to avoid or reduce adverse effects on material of the wheel $20_i$, including the tire material 45, which could otherwise arise if the temperature was too high, such as rapid degradation in certain material properties (e.g., flex fatigue and crack propagation resistance).

For example, in some embodiments, a surface area S of the annular beam 36 and the spoked support 41 may be significant in relation to a volume V of the annular beam 36 and the spoked support 41 to help facilitate convective heat transfer away from the wheel $20_i$.

For instance, in some embodiments, a "volume-to-surface-area" ratio $R_{VS}=V/S$ of the volume V of the annular beam 36 and the spoked support 41 over the surface area S of the annular beam 36 and the spoked support 41 may be relatively low. For example, in some embodiments, the volume-to-surface-area ratio $R_{VS}$ of the tire 34 may be no more than 20 mm³/mm², in some cases no more than 18 mm³/mm², in some cases no more than 15 mm³/mm², in some cases no more than 12 mm³/mm², in some cases no more than 10 mm³/mm², no more than 8 mm³/mm², and in some cases even less. In some examples of implementation, the volume-to-surface-area ratio $R_{VS}$ of the tire 34 being no more than 12 mm³/mm² may be particularly useful. As an example, for the tire 34 described above which is 1.5 m×0.5 m, the volume-to-surface area $R_{VS}$ may be about 8.4 mm³/mm². The volume-to-surface-area ratio $R_{VS}$ of the tire 34 may have any other suitable value in other embodiments.

Also, in some embodiments, it may be useful to specify a volume-to-surface-area ratio $R_{VS-b}$ of the annular beam 36 alone, i.e., of a volume $V_b$ of the annular beam 36 over a surface area $S_b$ of the annular beam 36. For example, in some embodiments, the volume-to-surface area ratio $R_{VS-b}$ of the annular beam 36 may be no more than 12 mm³/mm², in some cases no more than 10 mm³/mm², in some cases no more than 8 mm³/mm², in some cases no more than 6 mm³/mm², and in some cases no more than 4 mm³/mm². As an example, for the tire 34 described above which is 1.5 m×0.5 m, the volume-to-surface area $R_{VS-b}$ of the annular beam 36 may be about 7.9 mm³/mm².

As another example, in some embodiments, a maximum wall thickness $t_w$ of the annular beam 36 and the spoked support 41 may be significantly small in relation to the diameter $D_W$ of the wheel 20$_i$ to help facilitate convective heat transfer away from the wheel 20$_i$, while allowing a high compliance, low weight structure that can bear significant loading.

For instance, in some embodiments, a ratio $R_{td}=t_w/D_W$ of the wall thickness $t_w$ of the annular beam 36 and the spoked support 41 over the diameter $D_W$ of the wheel 20$_i$ may be no more than 5%, in some cases no more than 2.5%, in some cases no more than 2%, in some cases no more than 1.5%, in some cases no more than 1%, and in some cases even less. As an example, for the tire 34 described above which is 1.5 m×0.5 m, the maximum wall thickness of the annular beam 36 and the spoked support 41 may be 15 mm, which is 1% of the wheel's diameter. The ratio $R_{td}$ of the tire 34 may have any other suitable value in other embodiments.

The wheel 20$_i$ may thus be relatively light yet capable of bearing significant loading. For example, in some embodiments, a ratio $R_{LM}=F_{DESIGN}/M_W$ of a design load $F_{DESIGN}$ of the wheel 20$_i$ over the mass $M_W$ of the wheel 20$_i$ may be relatively high. The design load $F_{DESIGN}$ of the wheel 20$_i$ is a normal load expected to be encountered by the wheel 20$_i$ in use such that only the tire 34 deflects by a normal deflection. For instance, in some embodiments, the ratio $R_{LM}$ of the design load $F_{DESIGN}$ of the wheel 20$_i$ over the mass $M_W$ of the wheel 20$_i$ may be at least 15, in some cases at least 23, in some cases at least 30, and in some cases even more. As an example, for the wheel 20$_i$ discussed above, the design load may be 10,000 kgf and the mass may be 336 kg, giving the ratio $R_{LM}$ of about 30. The ratio $R_{LM}$ of the design load $F_{DESIGN}$ of the wheel 20$_i$ over the mass $M_W$ of the wheel 20$_i$ may have any other suitable value in other embodiments.

Without wishing to be bound by any theory, it may be useful to consider certain aspects of heat generation in elastomers and heat transfer relationships that may be involved in thermal equilibrium of tire-like structures.

Figure 5:
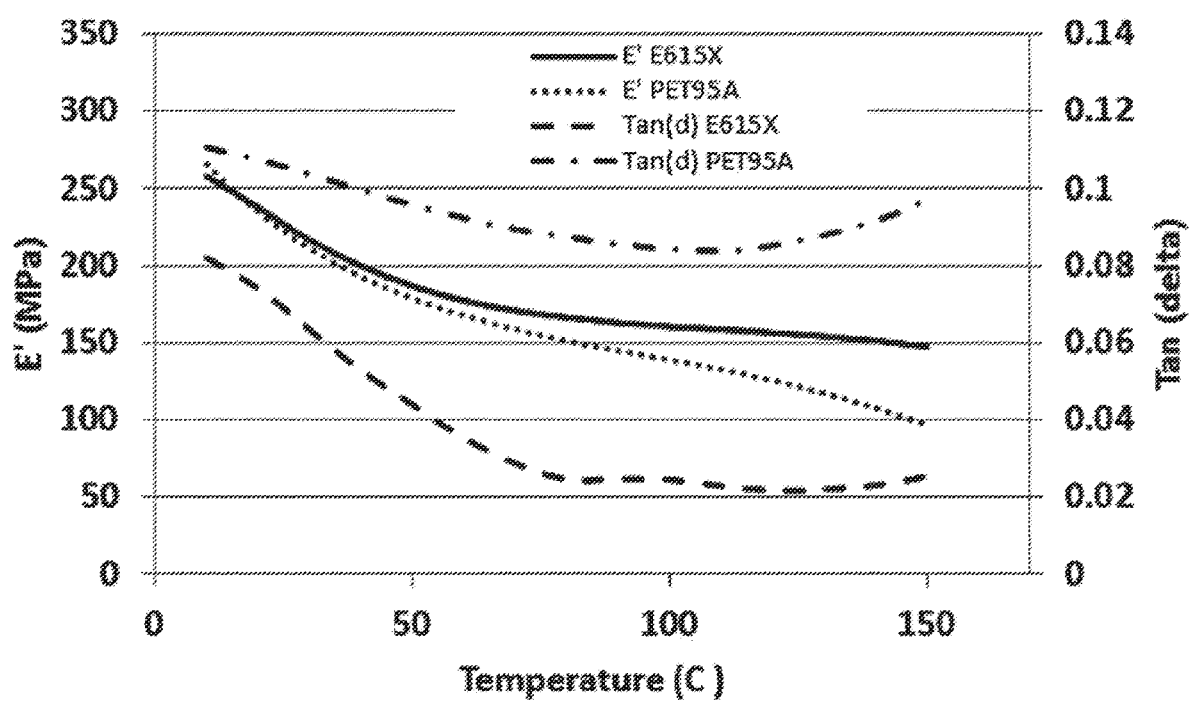
FIG. 5 shows a dynamic measurement analysis for two elastomers which may be used in making the non-pneumatic tire.

FIG. 5 shows a dynamic measurement analysis (DMA) of examples of two elastomers that may be appropriate for use in making the tire 34, namely PET95A produced by COIM Corporation, when cured with MCDEA curative, and E615X produced by Chemtura Corporation, when cured with C3LF curative. The plot shows variation of a storage modulus E' and a tangent delta (δ) with respect to temperature, when the elastomer specimen is subjected to a sinusoidal solicitation at 10 HZ frequency, with a tensile strain of 0.04.

These two elastomers may provide different advantages, which may lead to one being used for one application, and the other being used for other applications. The PET95 system, for example, may be useful for smaller tires in which faster cycle times are specified. This system is exothermic, meaning that the chemical reaction itself provides heat, and minimum heat may be required to heat the mold. The E615X system is a so-called "blocked" system, meaning that a certain mold temperature may be required in order to begin the curative+prepolymer reaction. It may be more advantageous to use for larger parts, for which a longer pot life and longer cycle time is specified.

When subject to sinusoidal solicitation, elastomers become hot. For instance, this heat energy can be expressed as power generation. Using results of such DMA tests, this power generation can be approximately calculated:

$$\dot{q}=\pi f E' \tan(\delta)\epsilon^2 \qquad (1)$$

Where $\dot{q}$=power generation
f=frequency
E'=storage modulus
δ=loss angle
$\epsilon$=strain amplitude A culprit behind the temperature increase in a tire (pneumatic or non-pneumatic) may be this power generation.

While this may be a negative effect for a pneumatic tire, it may be even more-so for a non-pneumatic tire. A reason for this can be seen from the DMA results of FIG. 5. The storage modulus E' decreases with increasing temperature; yet, the storage modulus is approximately equal to the dynamic modulus. This represents the structural stiffness of the elastomer. Since the load is structurally supported in a non-pneumatic tire, then tire stiffness decreases as temperature increases.

Furthermore, Equation 1 shows a quadratic relationship between elastomer strain and power generation. Under a constant load, such as that seen for a tire, the deflection will increase as temperature increases, which results in higher material strains. Therefore, Equation 1, plus the function of a tire, plus the DMA characteristics of suitable elastomers, can result in thermal runaway. A successful NPT in some examples of application (e.g., in some industrial applications such as construction and mining) should confront these physical facts to create a way by which the structure can efficiently evacuate heat and stabilize temperature.

Figure 6:
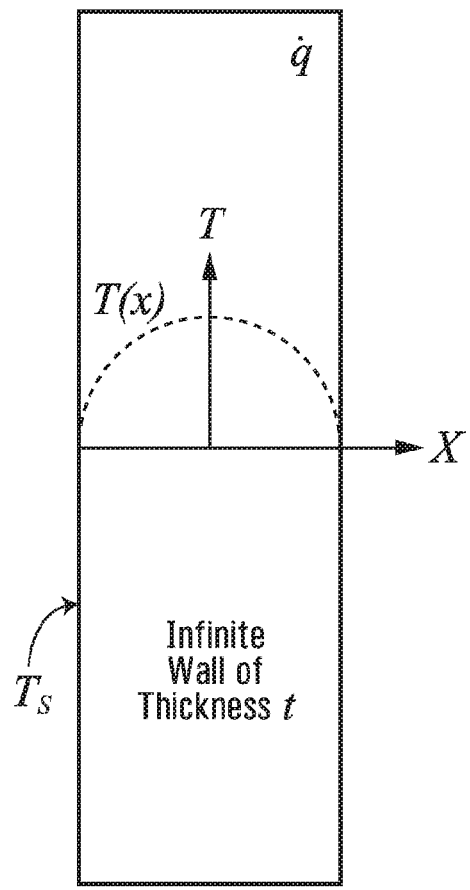
FIG. 6 shows aspects of basic physics of heat generation of the non-pneumatic tire.

Certain basic physics of heat generation of a non-pneumatic tire may be considered based on a one-dimensional heat equation. FIG. 6 shows an infinite wall of finite thickness t, exposed to convective cooling on either side, with an internal body heat generation.

Equation 2 gives a surface temperature of the wall:

$$T_s = \frac{\dot{q}t}{2h} + T_\infty \qquad (2)$$

where $\dot{q}$=wall internal heat generation
t=wall thickness
h=wall film convection coefficient
$T_\infty$=ambient temperature Equation 3 gives a maximum temperature at a center of the wall:

$$T_{max} = \frac{\dot{q}t^2}{8k} + T_s \qquad (3)$$

where k=wall thermal conductivity

Equation 4 gives a temperature variation within the wall:

$$T(x) = \left(1 - \frac{4x^2}{t^2}\right)(T_{max} - T_s) + T_s \qquad (4)$$

Through extensive numerical and physical testing, the inventors have discovered that Equations 2 and 3 are useful for understanding thermal behavior of an NPT such as the tire 34. Using this approach, they have discovered parameters related to the ratio of tire volume to tire surface area that may enable an NPT to be thermally efficient. They have also discovered design characteristics that may enable more efficient convective heat transfer from the tire to the surrounding air.

For example, it may be useful to consider Equation 1 used in the context of the DMA shown in FIG. 5, using PET95 as an example. From FIG. 5 for PET95A, the storage modulus E' at T=50 C is approximately 160 MPa, and tan(d) is about 0.10. 50 C represents an approximate temperature of the NPT structure. From Finite Element Modeling (FEM) the inventors estimate a strain amplitude of 0.04 to be an approximate average for a construction tire loaded to a design load. For a large tire of 1.55 meter diameter, traveling at 15 kph, rotation frequency=0.9 rev/sec, from Equation 1 $\dot{q}$=0.07 mW/mm$^3$, indicating that about 0.07 mW of power is generated in each cubic millimeter of elastomer.

To apply this to Equations 2 and 3, surface convection, wall conductivity, and ambient temperature may be taken as:

K=0.27 mm/mm/C, which is an approximate value for elastomers such as rubber and polyurethane;

h=0.02 mW/mm$^2$/C, which is the coefficient for air moving across a wall at 1 meter/second; and $T_\infty$=35 C, which is a moderately high temperature, similar to what one would find, for example, at a construction job site in the summer or in a deep underground mine.

The volume to area ratio of the infinite wall of FIG. 6 can be considered and then Equations 2 and 3 can be used to plot the maximum temperature relative to the volume to area ratio. The infinite wall of FIG. 6 has a volume of t×wall height×wall depth and a surface area of 2×wall height×wall depth, and, therefore, the volume to area ratio is t/2 in units of length.

Figure 7:
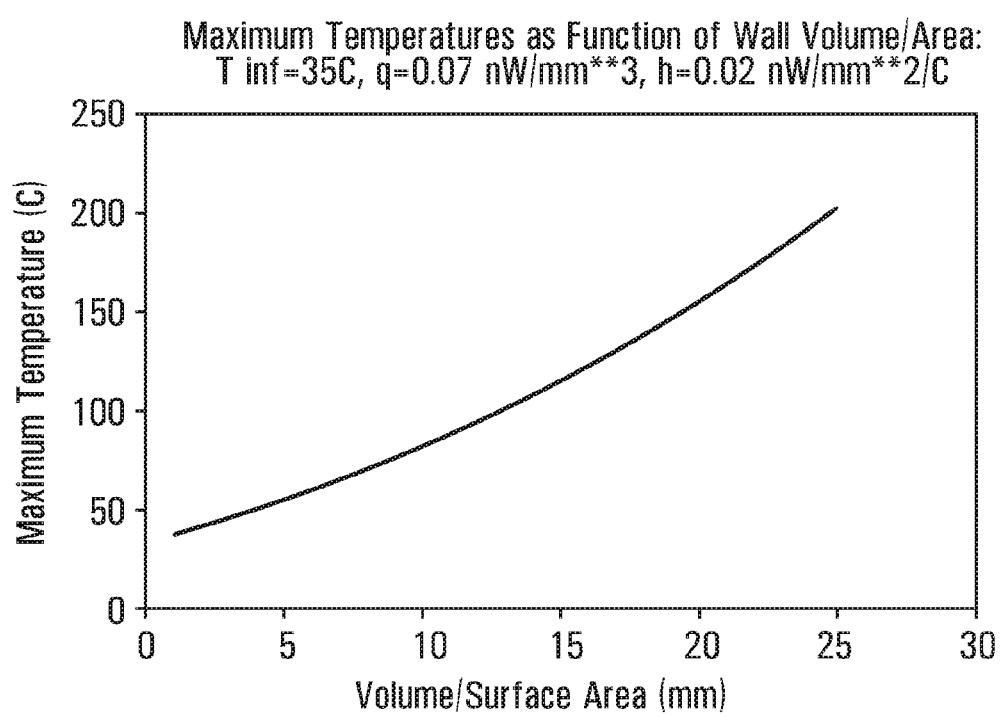
FIG. 7 shows a maximum temperature of a wall of the non-pneumatic tire as a function of a wall volume to surface area ratio.

FIG. 7 shows the maximum wall temperature as a function of the wall volume to surface area ratio, using parameter values previously given. The temperature exponentially increases with respect to the volume to surface area ratio. For a volume to area ratio of 1 mm$^3$/mm$^2$, the maximum wall temperature approaches the ambient temperature of 35 C. For a ratio of 13 mm$^3$/mm$^2$, the maximum temperature rapidly increases above 100 C.

Certain materials that may be used for NPTs, such as, for instance, cast thermoset polyurethanes, such as COIM's PET95A, cured with MCDEA, may withstand temperatures as high as 150 C, for short periods of time. However, those skilled in the art of polyurethane chemistry know that many properties—including flex fatigue and crack propagation resistance—begin to rapidly degrade at temperatures above 100 C. For some examples of application, a good practical maximum for steady-state operation may be considered as low as 80 C. Thus, from this 1D model, in some examples, a practical upper limit for the volume to surface area ratio may be $R_{VS}$≤12 mm.

NPTs, such as the tire 34 using tensile forces to transfer load from the contact patch 25 to the hub 32 (e.g., which may be integrally molded in one operation, without having any reinforcement extended in its circumferential direction), that may be designed according to the ratio $R_{VS}$ previously disclosed may be thermally efficient. This may permit a large tire for the construction industry to transport very large loads at moderate speeds.

The non-pneumatic tire 34 may also be thermally efficient using airflow in the axial (Y) direction of the wheel $20_i$ within the annular beam 36. More particularly, in this embodiment, the airflow in the axial direction of the wheel $20_i$ in the openings $56_1$-$56_N$ of the annular beam 36 may help to efficiently evacuate heat. The openings $56_1$-$56_N$ of the annular beam 36 thus form channels $67_1$-$67_N$ in which air flows in the annular beam 36 to transfer heat away from the tire 34 by convection.

The openings $56_1$-$56_N$ of the annular beam 36 may occupy a significant proportion of the annular beam 36 to allow the airflow in the axial direction of the wheel $20_i$, and therefore the convective heat transfer away from the annular beam 36, to be significant. Each opening $56_i$ has a volume $V_o$, a cross-sectional dimension $D_o$ normal to the axial direction of the wheel $20_i$, and a depth $B_o$ in the axial direction of the wheel $20_i$. In this embodiment, the cross-section of the opening $56_i$ is circular and constant in the axial direction of the wheel $20_i$ such that the cross-sectional dimension $D_o$ of the opening $56_i$ is a diameter of the opening $56_i$ and the volume $V_o$ of the opening $56_i$ is equal to $\pi D_o^2 B_o/4$.

For example, in some embodiments, an "openness" factor $R_o$ of the annular beam 36, which is a ratio of a sum of the volume $V_o$ of each of the openings $56_1$-$56_N$ of the annular beam 36 over a volume $V_B$ bounded by the annular beam 36, may be relatively high. The volume $V_B$ bounded by the annular beam 36 is given by $V_B = \pi(D_{BO}^2 - D_{BI}^2)W_B/4$ where $D_{BO}$ is an outer diameter of the annular beam 36, $D_{BI}$ is an inner diameter of the annular beam 36, and $W_B$ is a width of the annular beam 36 in the axial direction of the wheel $20_i$. For instance, in some embodiments, the openness factor $R_o$ of the annular beam 36 may be at least 0.4, in some cases at least 0.5, in some cases at least 0.6, and in some cases even more. The openness factor $R_o$ of the annular beam 36 may have any other suitable value in other embodiments.

The openings $56_1$-$56_N$ of the annular beam 36 may also be configured to promote the airflow through them.

Figure 8:
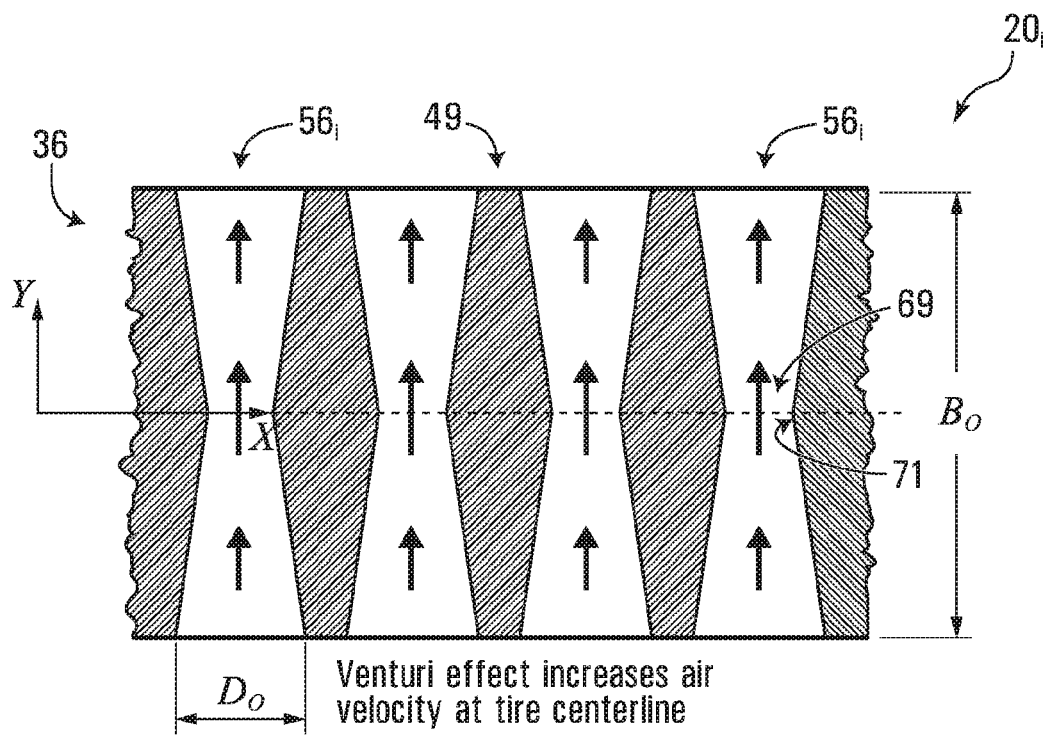
FIG. 8 shows a cross-section of an embodiment of an annular beam of the non-pneumatic tire in which a cross-section of each of a plurality of openings of the annular beam varies in an axial direction of the wheel.

For example, in some embodiments, as shown in FIG. 8, the cross-section of each opening $56_i$ of the annular beam 36 may vary in the axial direction of the wheel $20_i$ to promote the airflow in order to promote convective heat transfer away from the annular beam 36. More particularly, in this embodiment, the cross-section of the opening $56_i$ varies in the axial direction of the wheel $20_i$ to increase air velocity in a central region 69 of the opening $56_i$ away from the lateral sides 54, 49 of the wheel $20_i$ (e.g., at a centerline of the tire 34). In this example, the opening $56_i$ tapers inwardly in the axial direction of the wheel $20_i$ up to its central region 69 and is enlarged outwardly in the axial direction of the wheel $20_i$ towards the lateral sides 54, 49 of the wheel $20_i$. A constriction 71 of the opening $56_i$ may thus create a Venturi effect that tends to increase the air velocity at the central region 69 of the opening $56_i$. This may allow the maximum air velocity to be at the center, which generally coincides with the highest tire temperature. Thus, thermal heat evacuation may be optimized at the most favorable location.

Figure 9:
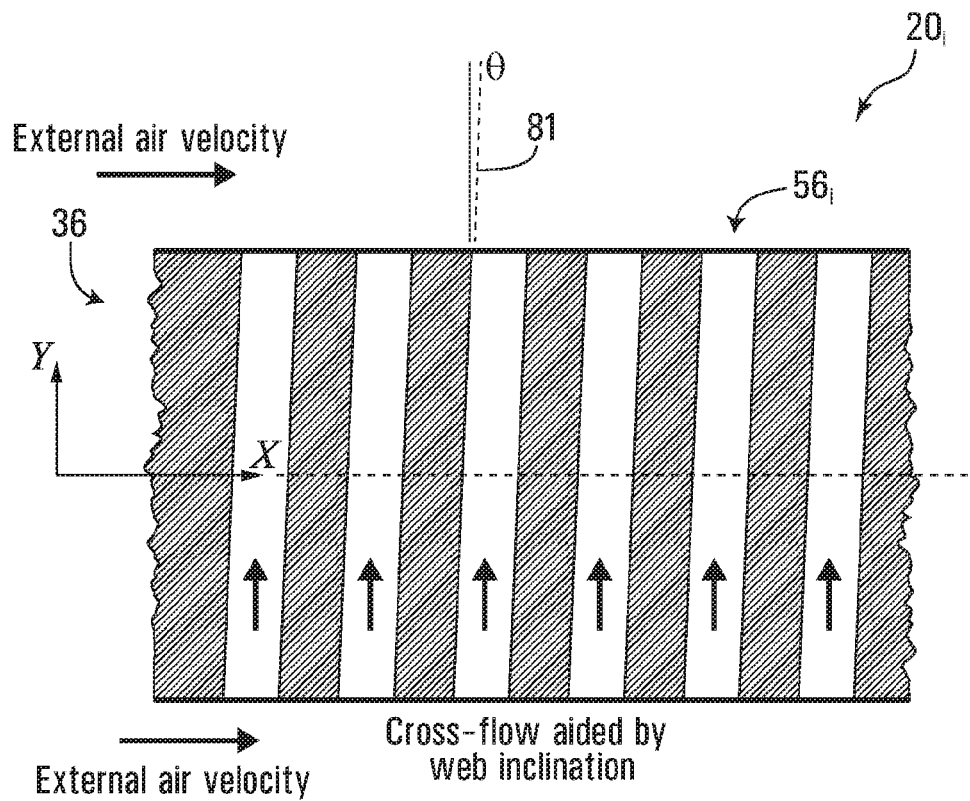
FIG. 9 shows a cross-section of another embodiment of the annular beam of the non-pneumatic tire in which each of a plurality of openings is directed at an angle relative to the axial direction of the wheel.

As another example, in some embodiments, as shown in FIG. 9, each opening $56_i$ of the annular beam 36 may be configured such that an airflow path within the opening $56_i$ is transversal (i.e., nonparallel) to the axial direction of the wheel $20_i$. The airflow may be enhanced as it may be more naturally generated due to a turbine-like effect. In this embodiment, the airflow path within the opening $56_i$ is directed at an angle θ relative to the axial direction of the wheel $20_i$. For instance, in this example, a central axis 81 of the opening $56_i$ is set at the angle θ relative to the axial direction of the wheel $20_i$. For example, in some embodiments, the angle θ may be at least 1°, in some cases at least 3°, in some cases at least 5°, and in some cases even more. For instance, in some cases, this may help to produce an airflow velocity in the webbing of between 0.6 to 1.0 m/s, for an external air velocity of 2.0 m/s.

In order for an NPT to efficiently evacuate heat, it may be desirable for the convection coefficient h to be relatively large and the effective ambient temperature to be relatively low. This can be seen from Equation 2: as the convection coefficient h becomes small, the wall surface temperature $T_S$ becomes large. For example, in some cases, of the convection coefficient h depends on the velocity of the air over the wall surface, as given by Equation 7:

$$h=10.45-v+10\sqrt{v} \qquad (7)$$

where v=relative speed of air over wall surface (units in meters and watts)

This is an empirical relationship, valid for v between about 0.1 m/s to about 20 m/s. As air velocity approaches 0, h becomes quite small—around 10 W/m²/C, or 0.010 mW/mm²/C. With such a small value of h, the temperatures in FIG. 7 increase by around 40 C in the range of an $R_{VS}$ of 8 to 12. It may thus be desirable to maximize airflow velocity across all wall surfaces.

Figure 10:
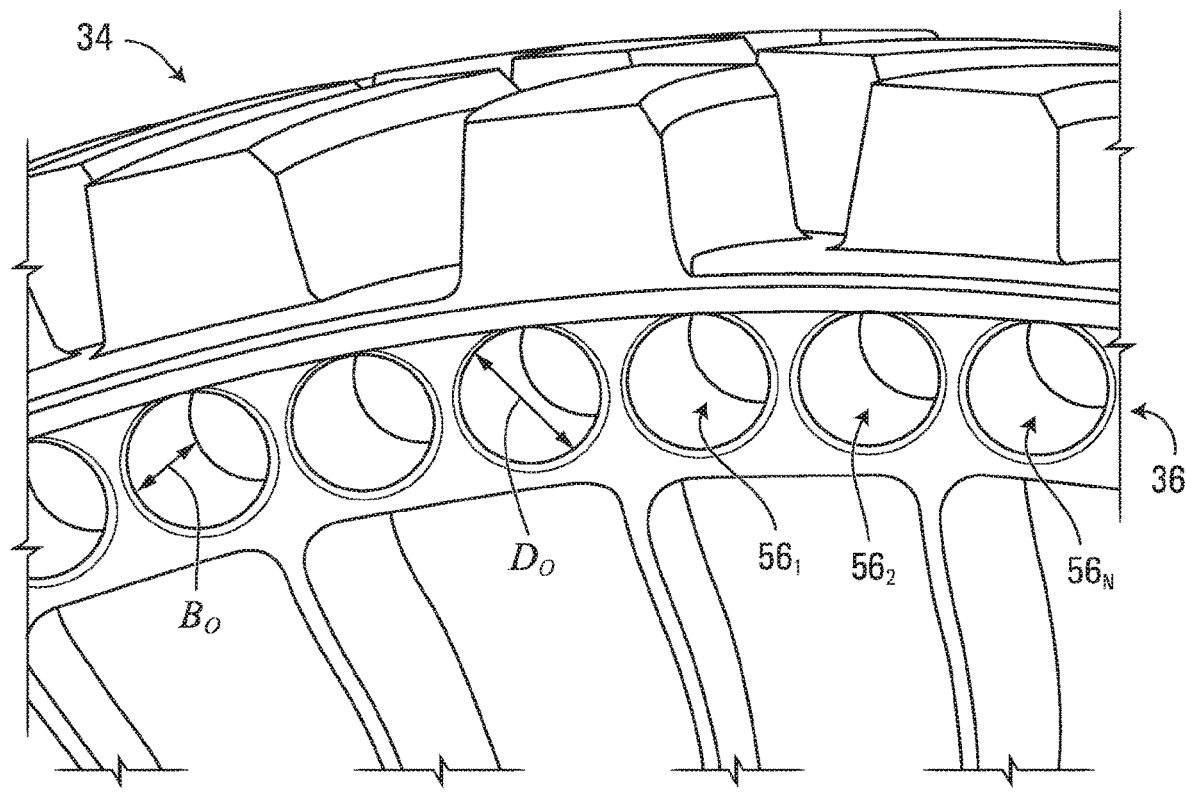
FIG. 10 shows a close-up view of a variant of the non-pneumatic tire.

FIG. 10 shows a close-up view of a variant of the tire 34 in which the openings $56_1$-$56_N$ of the annular beam 36 are arranged in a single circumferential row. When the tire 34 rolls, air freely passes across the outside diameter of the tire as well as enveloping the sides of the tire. However, achieving airflow in the axial Y direction through the openings $56_1$-$56_N$ of the annular beam 36 may also be beneficial. Otherwise, the surface area contained in the webbing of the annular beam 36 will be less effective in thermal cooling.

Through extensive numerical modeling and empirical measurements, the inventors have found surprising results, as follows:

When designed similar to FIG. 10, in which an opening $56_i$ completely traverses the axial extent of the annular beam 36, air flow through the web occurs.

For a 2 m/s air velocity in the X direction (enveloping the tire in the circumferential direction, like a rolling tire) air flow velocity in the axial Y direction through the opening $20_i$ can approach 0.5 m/s.

This may be true even with a large ratio of the depth $B_o$ of the opening $56_i$ over the cross-sectional dimension $D_o$ of the opening $56_i$ of 10:1 or larger.

Figure 11:
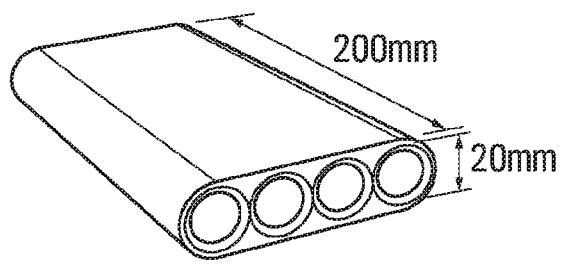
FIGS. 11 and 12 show a model structure of an embodiment of the annular beam of the variant.

Using Computational Fluid Dynamics (CFD), a web structure with features similar to the annular beam 36 of FIG. 10 has been modeled, as shown in FIG. 11. The web structure is a geometry of four hollow cylinders of 20 mm inner radius and 200 mm length. The pipe thickness is 4 mm. The hollow cylinders are connected together. This geometry may be viewed as a simplified representation of an annular beam having a webbing of 20 mm circular cut-outs that completely traverse a beam width of 200 mm.

Figure 12:
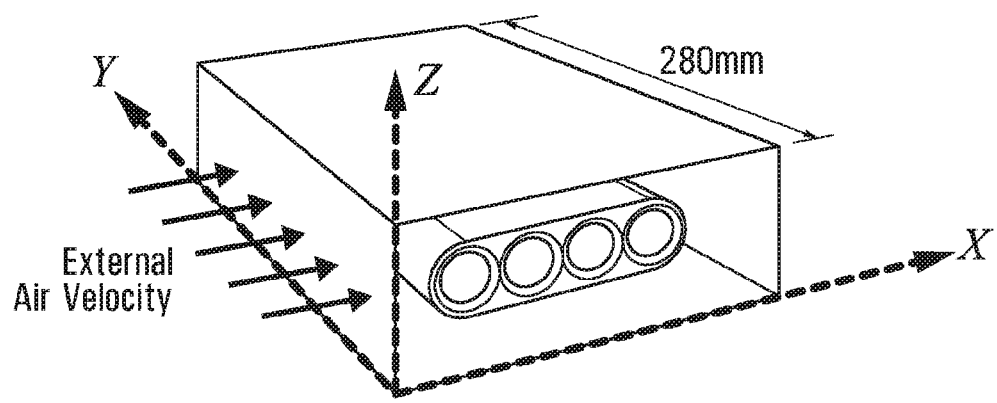

In CFD, a surrounding fluid medium, which encapsulates the object, is meshed; then, the fluid passes through the mesh in an Eulerian computation scheme. This is shown in FIG. 12. The web structure is placed in the center of an air volume, as shown. The air enters the mesh geometry on the YZ plane, and passes out of the mesh at the opposing end. The air velocity is 2.0 m/s at Y=0, and 2.2 m/s at Y=280 mm. This represents a condition actually seen in tires mounted on vehicles. The tire side close to the vehicle has a lower air velocity across the tire sidewall than the side mounted away from the vehicle. The air entrance temperature was set to 40 C, and the cylinder structure outer wall temperature was set to 80 C.

Figure 13:
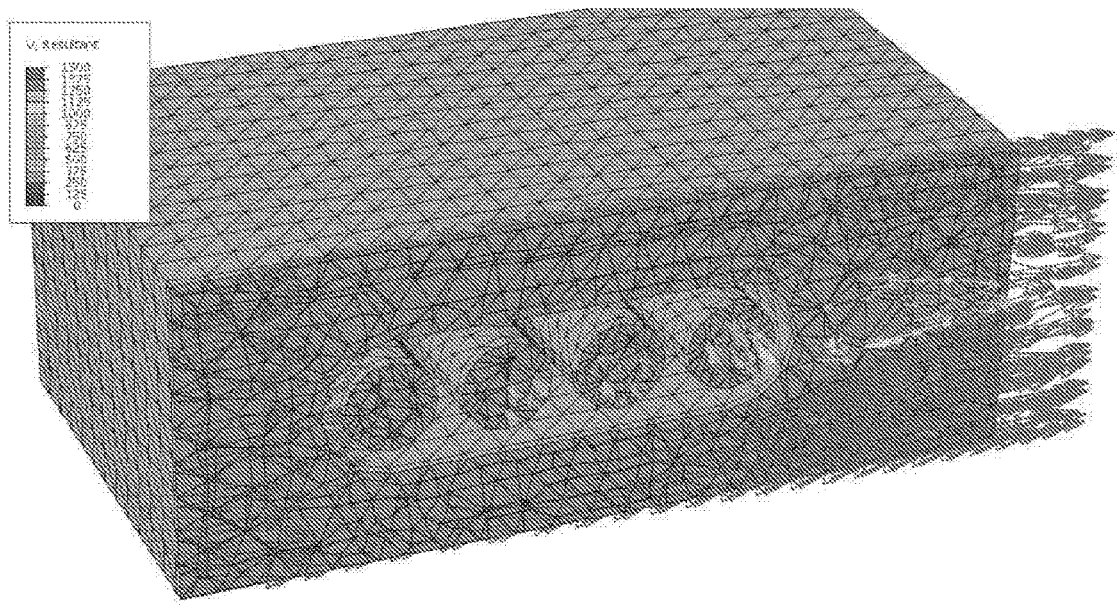
FIGS. 13 and 14 show computational fluid dynamics predictions for air velocity and air temperature at a surface of the model structure of the annular beam of FIG. 11.

Steady-state CFD results for predicted air velocity vectors are shown in FIG. 13, for an XZ plane in the center of the model. As expected, the air flows around the web structure. However, unexpectedly, the air is predicted to also flow through the circular webbing. There is very little flow through the first hole, then progressively more for the $2^{nd}$, $3^{rd}$ and $4^{th}$ hole. Air velocity in the $4^{th}$ hole is about 500 to 600 mm/s. As the annular beam 36 of the tire 34 of FIG. 10 is continuous in the circumferential direction with a webbing that is repeated in an unbroken fashion, in some embodiments, it is reasonable to expect that an air velocity through the tire 34 will approximate that seen in the $4^{th}$ hole of FIG. 13.

Figure 14:
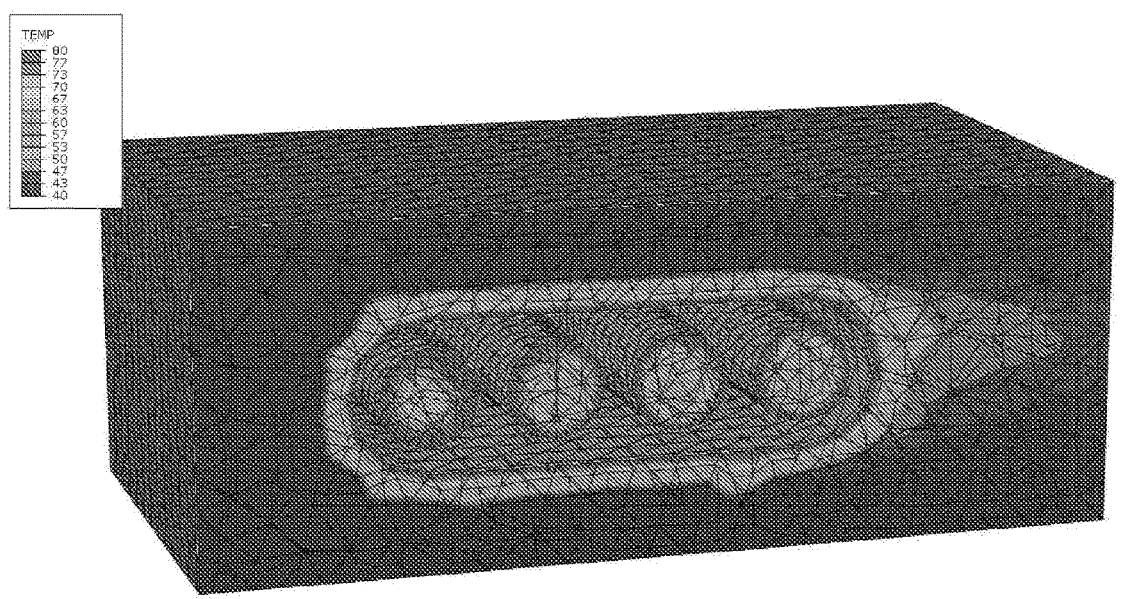

FIG. 14 shows CFD predictions for air temperature. In the $4^{th}$ web hole, the air temperature is about 58 degrees in the central section. This air temperature represents the effective ambient temperature ($T^\infty$) for the surface area of the webbing portion as it traverses the annular beam. From Equation 7, h=0.017 mW/mm².

Figure 15:
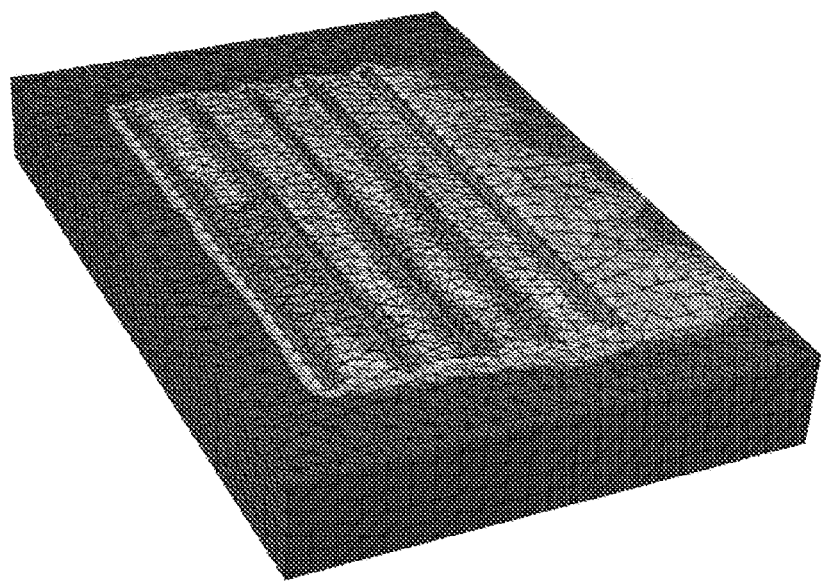
FIG. 15 shows computational fluid dynamics predictions for temperature in the model structure of the annular beam of FIG. 11.

FIG. 15 shows CFD predictions for temperature in an XY section at the center of the model. Along the axis of the $4^{th}$ web hole, the temperature profile is essentially homogeneous, indicating a constant thermal convection through the axial extent of the structure.

After significant study of these results, the inventors have realized that NPTs such as the tire 34 may provide an unexpectedly positive benefit in some embodiments. The air temperature in the webbing of the annular beam 36 becomes hot. Then, due to the ideal gas law, the air pressure increases. Because the openings $56_1$-$56_N$ of the annular beam 36 are continuous across the axial extent of the annular beam 36, an instability is created—the air is unconstrained and will naturally flow from high pressure to low pressure. Thus, cross flow occurs.

Figure 16:
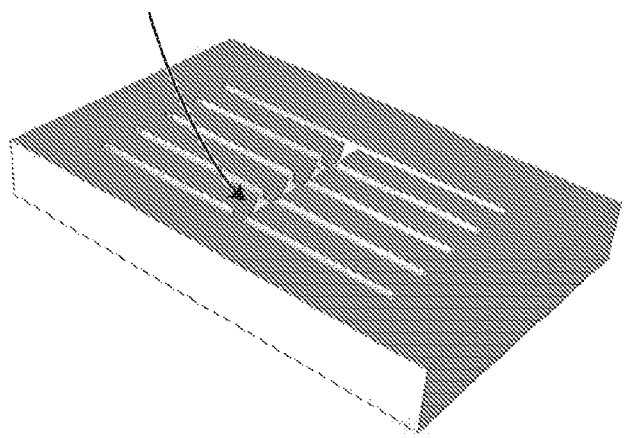
FIG. 16 shows a model structure of another embodiment of the annular beam of the variant in which with a wall at a structure center of the annular beam closes a plurality of openings.

The inventors have experimented with other structures. For example, FIG. 16 shows a similar webbing design, yet with a wall at the structure center that closes the web.

Figure 17:
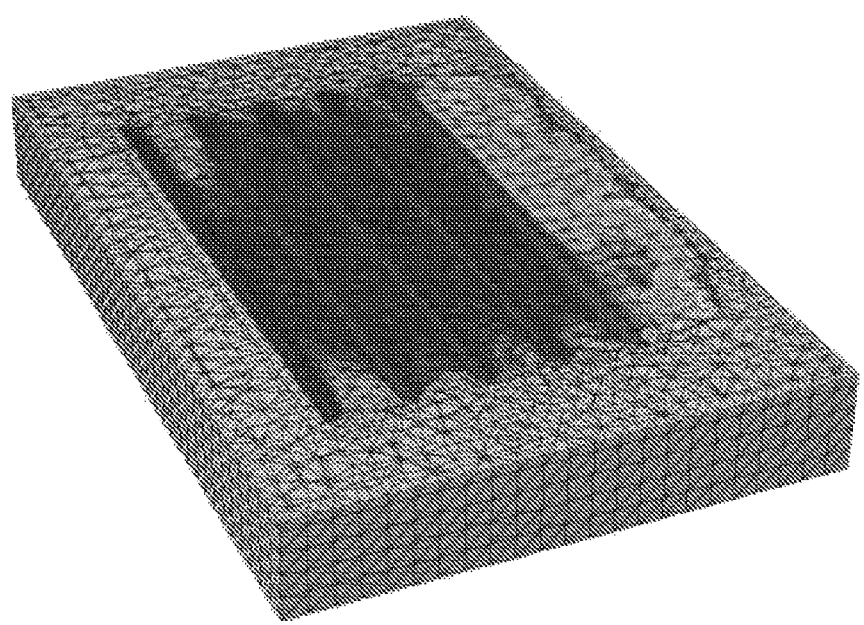
FIGS. 17 and 18 show computational fluid dynamics predictions for air velocity and air temperature in the model structure of the annular beam of FIG. 16.
Figure 18:
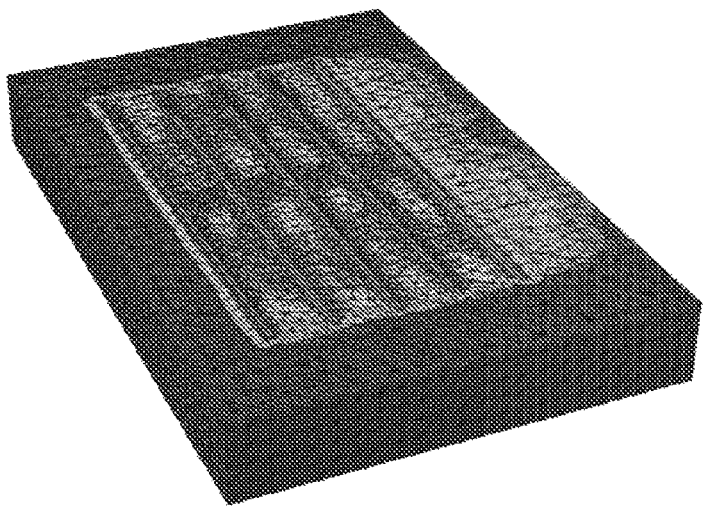

While having a central wall may be beneficial for structural rigidity and may simplify manufacturing, when modeled with CFD using the same procedure as before, the air velocity and temperature profiles are much less favorable. FIG. 17 shows the air velocity profile for an XY plane at the model center. Away from the web hole entrances, the air velocity is essentially zero at all locations within each hole. FIG. 18 shows the accompanying CFD predictions for air temperature. The air is essentially at an iso temperature of 80 C, the same as the web structure. With no air velocity, and a $T_\infty$ that equals the wall temperature, there can basically be no heat transfer.

Figure 19:
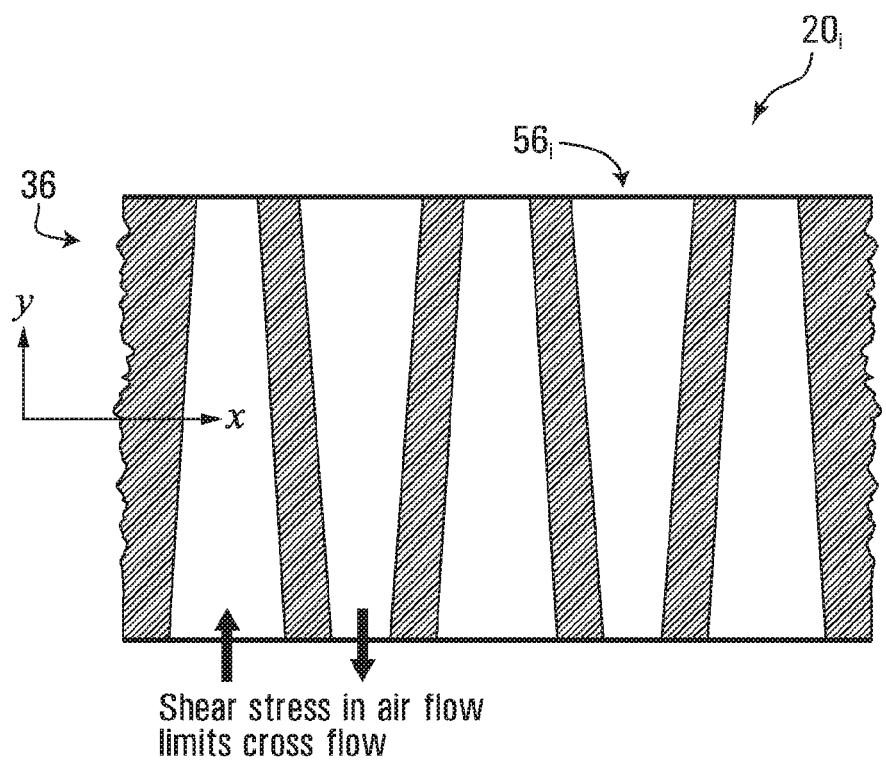
FIG. 19 shows a cross-section of another embodiment of the annular beam of the non-pneumatic tire in which the plurality of openings has alternating draft angles.

The inventors have studied effects of draft angle also. In such structures, alternating draft angles can be used. For example, one web hole is drafted such that a demolding operation is done in one axial direction, and an adjacent web hole is drafted such that it is demolded in the opposite direction. This is shown in FIG. 19. In this fashion, wall thickness can be held constant and draft angles can be large. However, in some cases, this structure may not be desirable as it may be almost as inefficient as closing off the web structure with a central wall. Air flow may tend to be in a direction in which the web hole cross section is increasing; thus, this may create air shear forces at each entrance/exit of the web structure. This air shear may serve as a resistance to axial air flow.

The inventors have used commercially-available thermomechanical simulation tools to model NPT tires. Endurica Corp. leases software capable of predicting steady-state rolling resistance and temperature of pneumatic and non-pneumatic structures. Endurica can be used with the FE program Abaqus to model the complex behavior of elastomers, including loss modulus and storage modulus dependencies on temperature, strain level, and strain rate.

Figure 20:
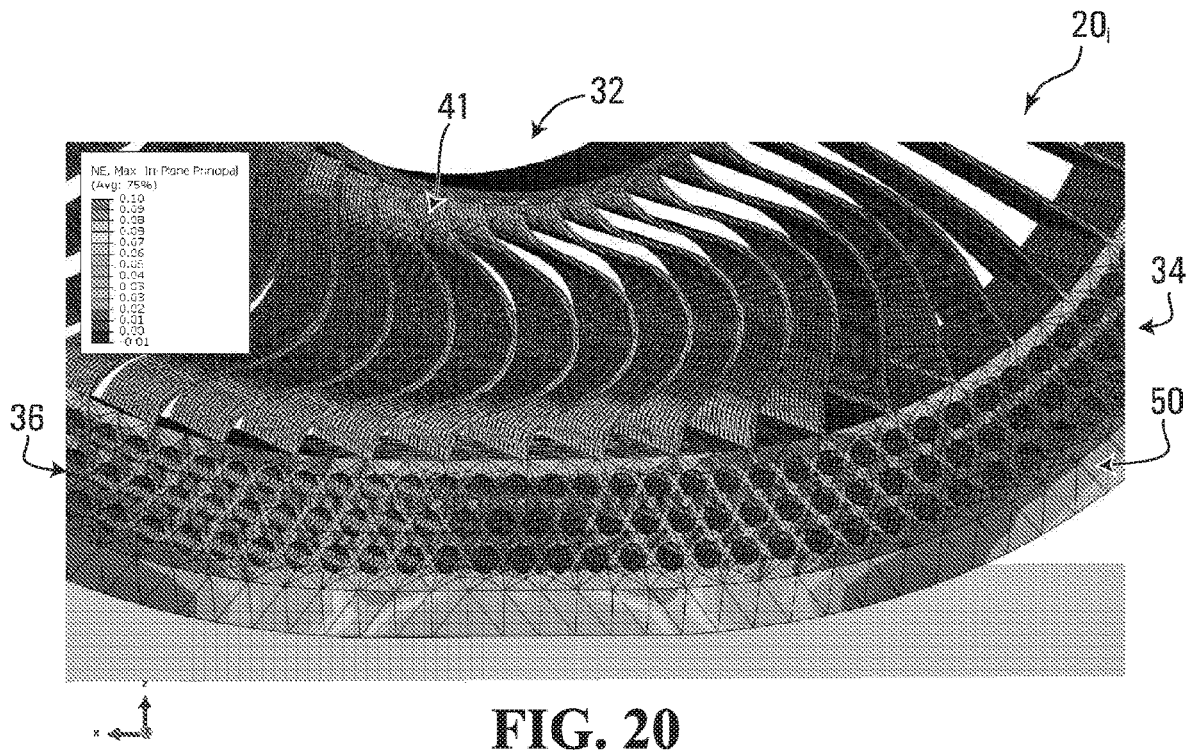
FIGS. 20 and 21 show structural modeling results and thermal predictions for an embodiment the non-pneumatic tire.

Structural modeling results are shown in FIG. 20 for an example of an embodiment of the wheel $20_i$. The tire 34 has an $R_{VS}$ of 8.4 mm³/mm². The maximum principle strains are shown for an NPT of 1.55 meter diameter and 0.5 meters in width, which is a replacement for the 20.5×25 pneumatic tire. This tire is carrying 10 metric tonnes at 10 kph, using an ambient temperature of 40 C. The annular beam 36, the spoked support 41, and the hub 32 are all made from isotropic PET95A+MCDEA. The tread 50 is composed of a cast polyurethane. The elastic modulus of each element of this model has been corrected to reflect the operating temperature of each element. Therefore, this is the result of a multi-physics calculation.

The maximum principle strain is predicted to be about 0.06 for the spokes and the annular beam. Testing has shown the capability to withstand $5 \times 10^6$ cycles or more, at this strain level.

Figure 21:
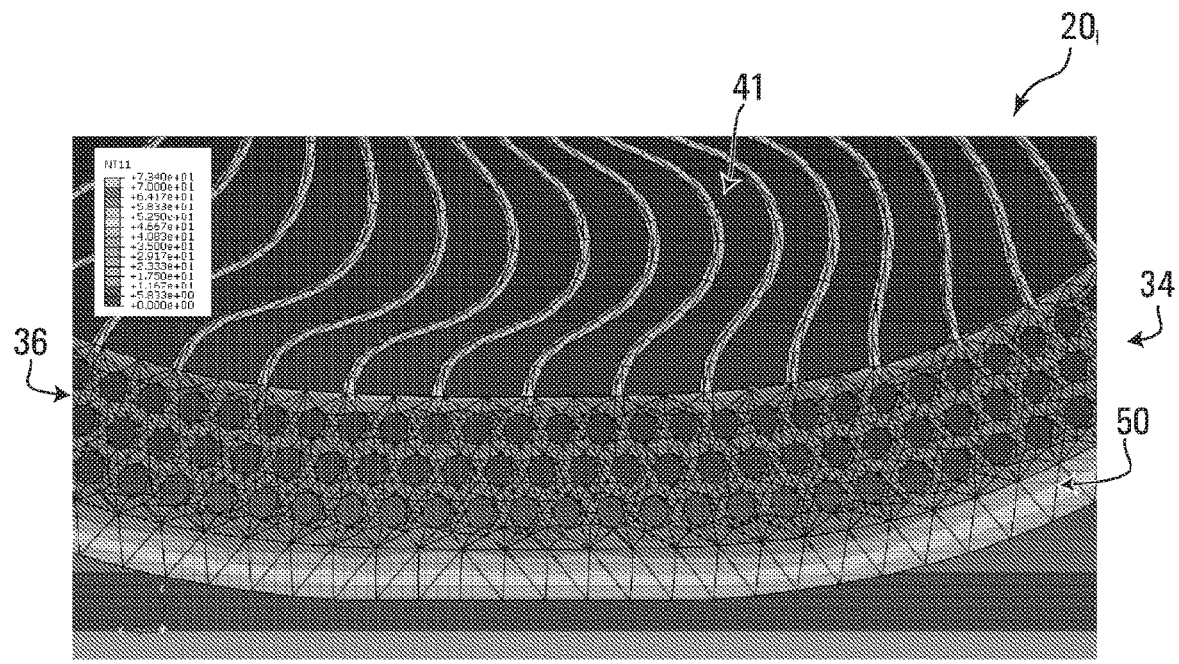

Thermal predictions for this tire at these conditions is shown in FIG. 21. In this model, results presented earlier were used to obtain values for h and $T_\infty$ in the web structure of the annular beam 36.

The maximum temperature is about 70 C, in the annular beam 36. At this temperature, cast polyurethanes in the family of PET95A retain excellent material properties, including resistance to crack propagation and flex fatigue. Thanks to the low volume to surface ratio ($R_{VS}$=8.4 mm), the thermal behavior of the structure approximates an infinite wall, the results of which were shown in FIG. 7. This is helped by the air cross flow, which is facilitated by the web openings completely traversing the annular beam in the axial Y direction.

2. Enhanced Resistance to Crack Propagation

In some embodiments, the wheel $20_i$ may have a resistance to crack propagation that is enhanced so as to reduce a potential for the wheel $20_i$ to prematurely fail due to crack propagation within the wheel $20_i$. Notably, in some cases, if left unchecked, small irregularities on surfaces of the wheel $20_i$ that are a product of a manufacturing process of the wheel $20_i$ (e.g., molding) and/or wear of the wheel $20_i$ (e.g., a cut or other damage on a surface of the tire 34) may arise and act as sites for cracks to be initiated and then expanded and propagated as the wheel $20_i$ undergoes more usage cycles. For example, construction and mining tires operate in hostile environments. Rocks and other hazards can cut, chip, or tear the structure of the tire. Resistance to crack propagation is a key performance attribute for tires operating in these environments.

Thus, in some embodiments, the resistance to crack propagation of the wheel $20_i$ may be increased to prevent or at least limit crack propagation within the tire 34 and/or the hub 32.

Figure 22:
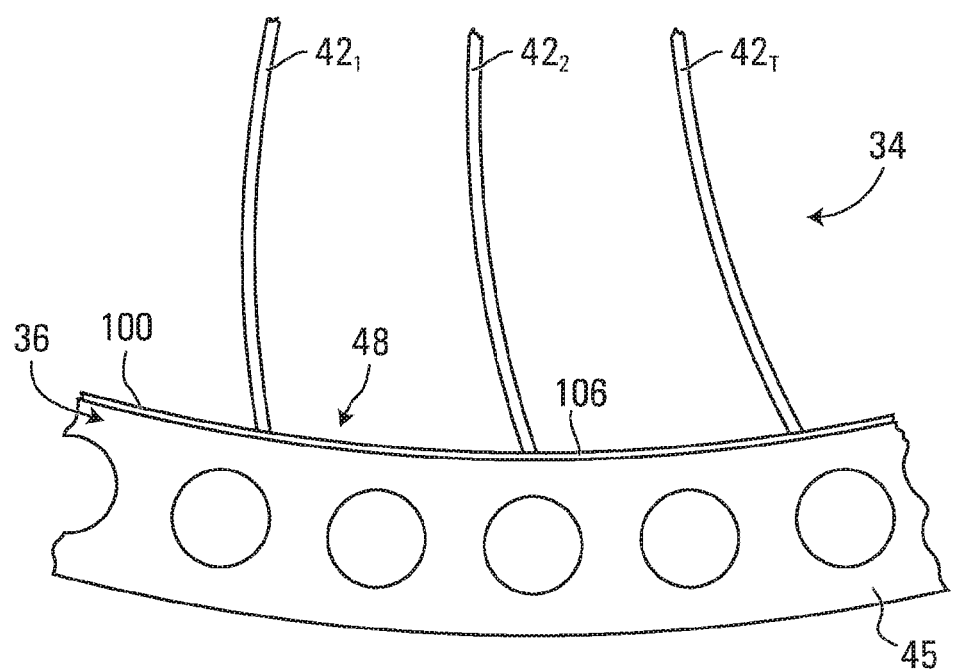
FIG. 22 shows a cross-section of an embodiment of the non-pneumatic tire that may be more resistant to crack propagation.

For example, in some embodiments, as shown in FIG. 22, the tire 34 may comprise a tire material 106 that is different from the tire material 45 such that the tire material 106 is more resistant to crack propagation than the tire material 45, i.e., a crack propagation resistance of the tire material 106 is greater than a crack propagation resistance of the tire material 45. For instance, in some embodiments, a ratio of the crack propagation resistance of the tire material 106 over the crack propagation resistance of the tire material 45 may be at least 3, in some cases at least 4, in some cases at least 5, in some cases at least 10, and in some cases even more. Each of the crack propagation resistance of the tire material 106 and the crack propagation resistance of the tire material 45 can be evaluated on a basis of a crack growth rate (e.g., in mm per number of cycles) measured using a suitable crack growth test (e.g., a tension-tension or flex fatigue test at imposed cyclic strain) on that material, such that the crack propagation resistance is inversely related to the crack growth rate (i.e., the lower the crack growth rate, the higher the crack propagation resistance).

The tire material 106 may be more resistant to crack propagation in various ways. For example, in some embodiments, the tire material 106 may be less stiff and/or less hard than the tire material 45.

For instance, in some embodiments, a modulus of elasticity $E_1$ of the tire material 45 (e.g., Young's modulus) may be greater than a modulus of elasticity $E_2$ of the tire material 106. For example, in some embodiments, a ratio $E_1/E_2$ of the modulus of elasticity $E_1$ of the tire material 45 over the modulus of elasticity $E_2$ of the tire material 106 may be at least 2, in some cases at least 3, in some cases at least 5, and in some cases even more. For instance, the harsher the environment, the greater the ratio $E_1/E_2$ may be.

The tire material 106 may be arranged in any suitable manner. For example, in this embodiment, the tire material 106 forms a protective layer 100 constituting at least part of the inner peripheral surface 48 of the annular beam 36 of the tire 34. In this example, the protective layer 100 constitutes at least a majority, in this case substantially an entirety, of the inner peripheral surface 48 of the annular beam 36.

A thickness $T_P$ of the protective layer 100 may have any suitable value. For instance, in some embodiments, a ratio of the thickness $T_P$ of the protective layer 100 over the diameter $D_W$ of the wheel $20_i$ may be at least 0.3%, in some cases at least 0.5%, in some cases at least 0.8%, and in some cases even more. For example, in some embodiments, the thickness $T_P$ of the protective layer 100 may be at least 1 mm, in some cases at least 3 mm, in some cases at least 5 mm, in some cases at least 7 mm, and in some cases even more.

In this embodiment, the spokes $42_1$-$42_T$ of the tire 34 are also made of the tire material 106. Thus, in this example, only the annular beam 36 of the tire 34 comprises the tire material 45. This may simplify manufacturing of the tire 34 in some embodiments. However, in other examples, the tire material 106 may be confined to the protective layer 100 of the annular beam 36 such that the spokes $42_1$-$42_T$ comprise the tire material 45 or yet another tire material.

The tire material 106 may be provided in any suitable way. For example, in this embodiment, the tire material 106 may be provided during spin casting of the tire 34 by introducing the tire material 106 so that it is located as desired in the tire 34.

When the tire 34 is loaded in contact, the annular beam 36 supports a bending load, such that the inner peripheral surface 48 of the annular beam 36 is placed under tension and develops a tensile stress. The inner peripheral surface 48 of the annular beam 36 may also be exposed to a potentially harsh environment (e.g., cuts and tears due to normal operation in an off-road environment are possible). With the modulus of elasticity $E_2$ of the tire material 106 lower than the modulus of elasticity $E_1$ of the tire material 45, the tensile stress at the inner peripheral surface 48 of the annular beam 36 can be reduced.

Without wishing to be bound by any theory, Paris Law describes certain aspects of crack propagation. Paris Law can be expressed to give a number of fatigue cycles to failure as a function of several key variables, provided in Equation 8:

$$N_f = \frac{2\left(a_c^{\frac{2-m}{2}} - a_i^{\frac{2-m}{2}}\right)}{(2-m)C(\Delta K)^m} \tag{8}$$

Where: $N_f$=number of cycles to failure
$a_c$=critical crack length
$a_i$=initial crack length C=geometry parameter
ΔK=cyclic variation in stress intensity
For a tensile stress field, stress intensity variation relates to tensile stress as given in Equation 8:

$$\Delta K = \Delta \sigma \sqrt{\pi a} \quad (9)$$

Figure 23:
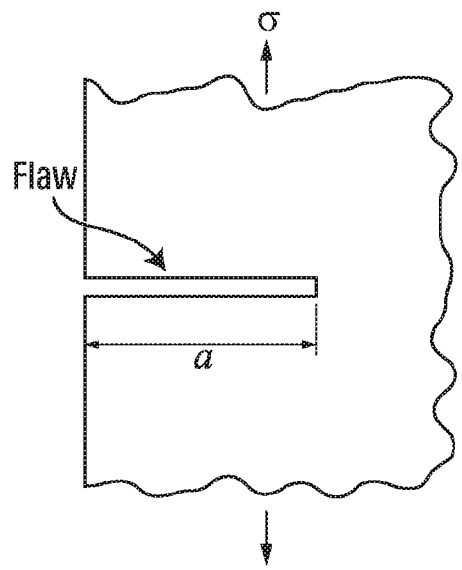
FIG. 23 shows a relation between stress intensity variation and tensile stress for a tensile stress field.

Where: ←σ=cyclic variation of tensile stress
a=crack length
This is illustrated in FIG. 23.

For example, for cast polyurethanes in the class of PET95A, an approximate value of m is 4.0. This may be significant in light of Equation 8. The number of cycles to failure, $N_f$, will increase as ΔK decreases, to the $4^{th}$ power. Therefore, if the cyclic stress Δσ is reduced by a factor of 2, $N_f$ increases by $2^4$=16. If Δσ is reduced by a factor of 3, $N_f$ increases by $3^4$=81.

When $E_2 < E_1$, the tensile stress at the surface will be reduced. According to Equations 8 and 9, fatigue performance can be greatly improved.

Figure 24:
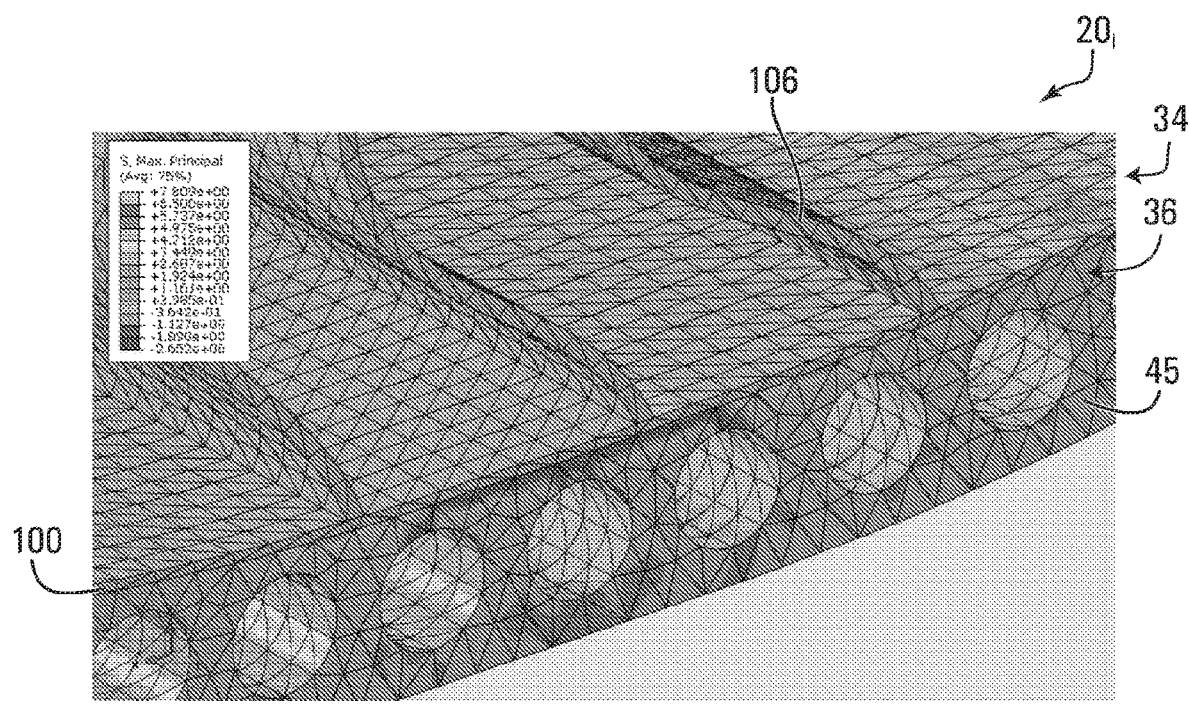
FIGS. 24 and 25 show finite element simulation results of the wheel for two different annular beam materials.
Figure 25:
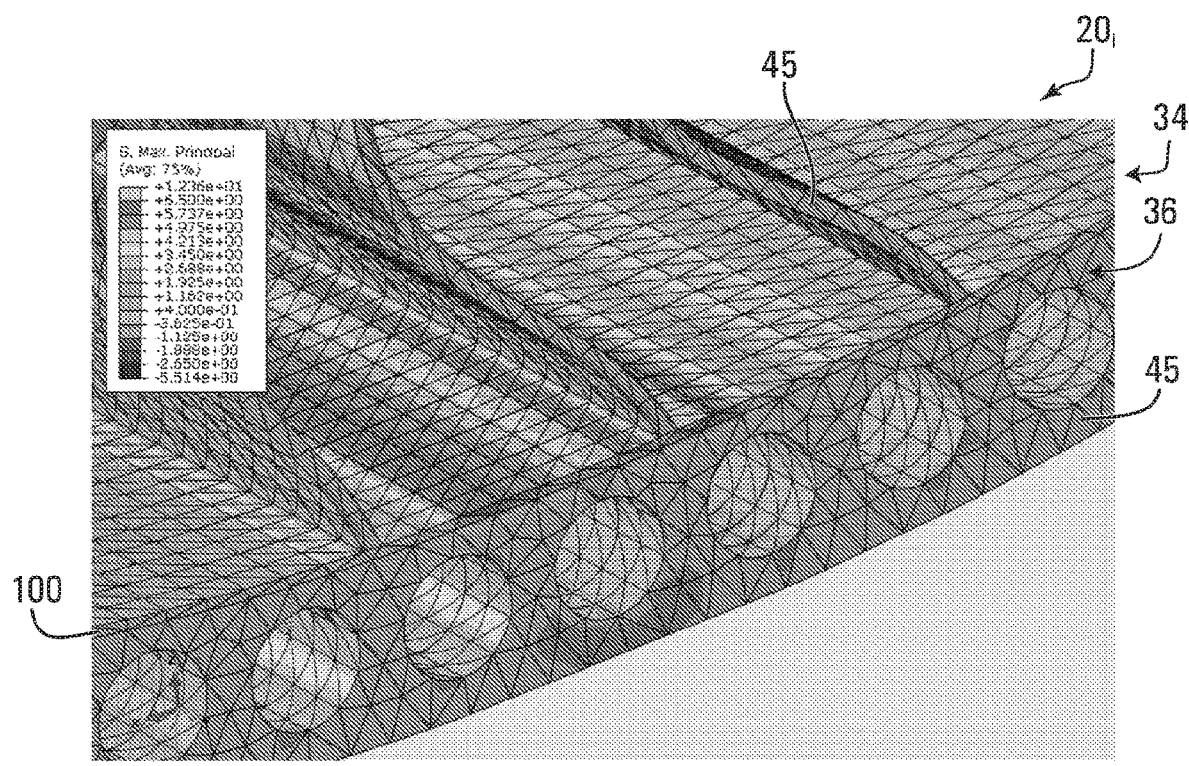

FE simulation results on an example of an embodiment of the wheel $20_i$ are shown in FIG. 24. FIG. 24 shows the case where the tire 34 is loaded to an operating load. In this model, the modulus of the spokes and a 1.5-mm thick inner layer of the annular beam 36 is composed of the tire material 106 with E2=60 MPa. The tire material 45 has an E1=180 MPa. The maximum principle stress for this NPT at the radially inward surface of the annular beam is predicted to be 2.2 MPa. FIG. 25 shows a model using the same geometry and mesh, loaded to the same load, but with the tire material 45 with E1=180 MPa used for the entire tire. In this case, the maximum principle stress at the radially inward surface of the annular beam is predicted to be 6.9 MPa. From Equation 8, it may be expected an improvement in crack propagation of perhaps two orders of magnitude.

The protective layer 100 formed by the tire material 106 may additionally or alternatively act as a sacrificial layer which can be subjected to damage that would otherwise be subjected on the inner peripheral surface 48 of the annular beam 36.

Crack propagation within the tire 34 may not be limited to the annular beam 36. For example, the spokes $42_1$-$42_T$ of the tire 34 may also be susceptible to crack propagation. Notably, if the spokes $42_1$-$42_T$ are cut or otherwise damaged while the wheel $20_i$ is in use, the resulting damaged areas may behave as small cracks that expand as the wheel $20_i$ is subjected to more usage.

To that end, in some embodiments, the tire 34 may be configured to reduce crack propagation at the spokes $42_1$-$42_T$.

Figure 26A:
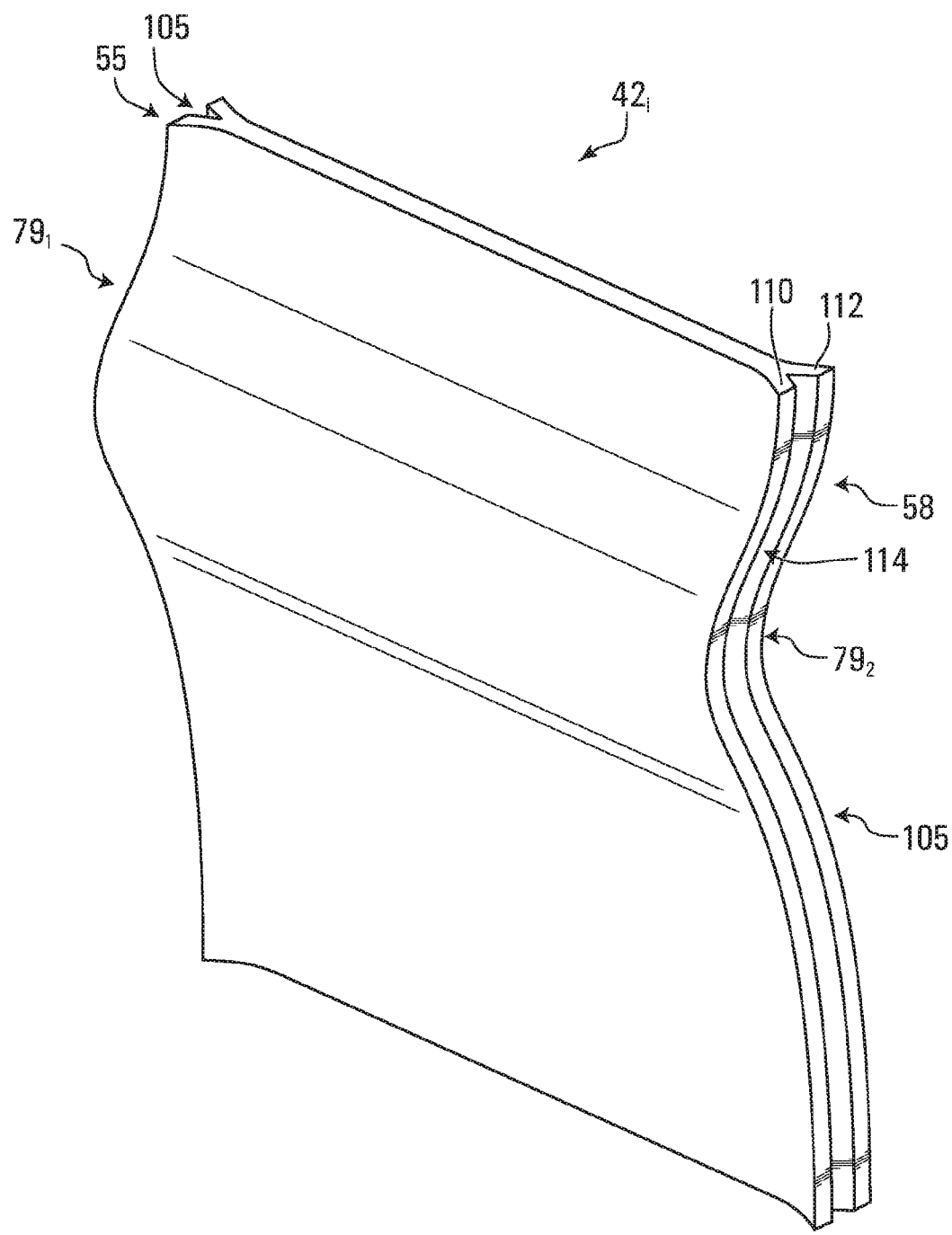
FIG. 26A shows an example of an embodiment of a support member of the tire that comprises a stress reducer.

For instance, in some examples of implementation, with additional reference to FIG. 26A, the spokes $42_1$-$42_T$ may comprise a stress reducer 105 in each of its lateral end portions $79_1$, $79_2$ to reduce stress and/or stress concentration at its lateral end portions $79_1$, $79_2$. In this embodiment, the stress reducer 105 of each lateral end portion $79_x$ of a spoke $42_i$ comprises a cavity (i.e., a hollow space) 114 configured to reduce stress and/or stress concentration in the spoke $42_i$ as it deforms in use. For example, the presence of the cavity 114 may reduce a bending stress to which a lateral end portion $79_x$ of a spoke $42_i$ is subjected, which in turn may reduce potential for crack propagation.

More particularly, in this embodiment, the lateral end portion $79_x$ of the spoke $42_i$ is forked such that it comprises a first portion 110, a second portion 112, and the cavity 114 located between the first and second portions 110, 112. The cavity 114 extends along at least a majority of a length of the lateral end portion $79_x$ of the spoke $42_i$. For instance, the cavity 114 may extend along an entirety of the length of the lateral end portion $79_x$ of the spoke $42_i$. In this example, the cavity 114 is made via molding, such as during molding in a mold used in production of the tire 34. Any other suitable way of producing the cavity 114 may be implemented in other examples (e.g., post-molding machining).

The stress reducer 105 of each lateral end portion $79_x$ of a spoke $42_i$ may be implemented in any other suitable way in other embodiments.

Figure 26B:
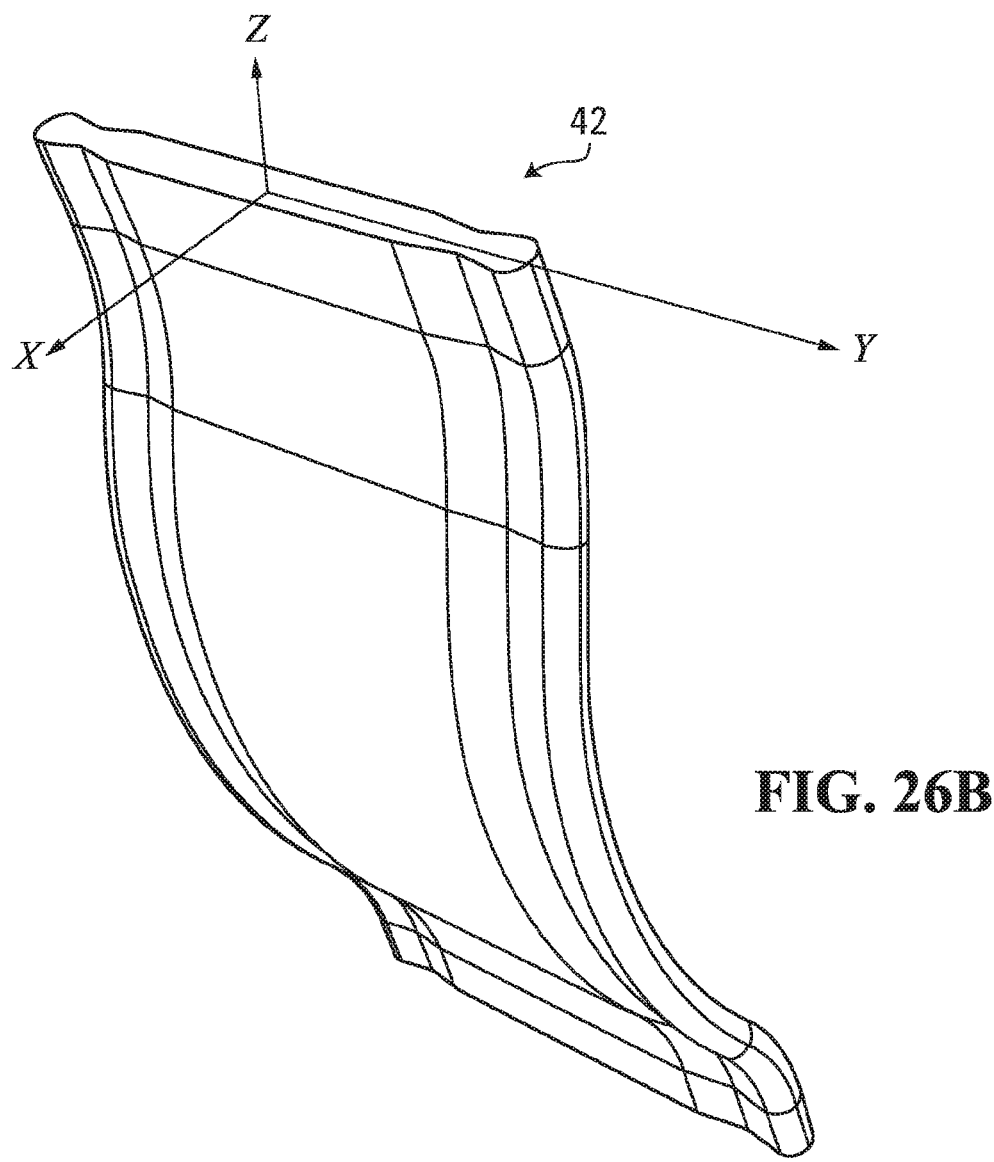
FIGS. 26B and 26C show an example of another embodiment of a support member of the tire that comprises a variant of a stress reducer.
Figure 26C:
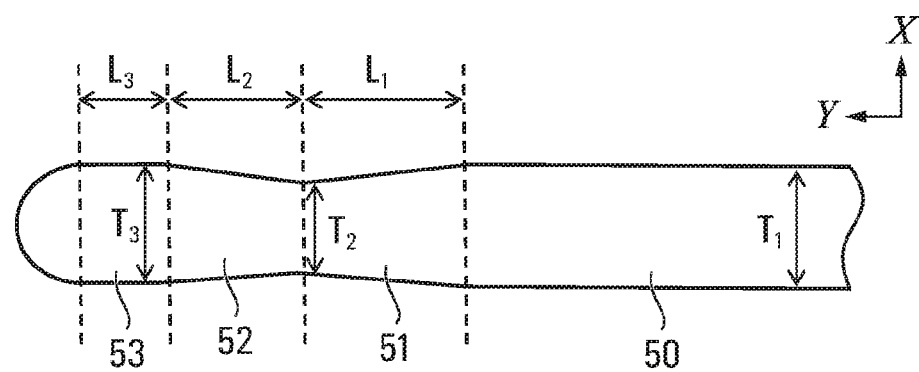

For example, in some embodiments, as shown in FIGS. 26B and 26C, the stress reducer 105 may include a variation of the thickness $T_S$ of the lateral end portion $79_x$ of a spoke $42_i$ such that the thickness $T_S$ of the lateral end portion $79_x$ of the spoke $42_i$ decreases and then increases towards a lateral end of the spoke $42_i$, i.e., there is a constriction of a cross-section of the spoke $42_i$. FIG. 26B shows an isometric view of the spoke $42_i$ while FIG. 26C shows the cross section of the spoke $42_i$. The thickness $T_S$ of the spoke $42_i$: has a substantially constant value $T_1$ over a main body 50 of the spoke $42_i$; decreases to a value $T_2$ over a length $L_1$; increases to a value $T_3$ over a length $L_2$; remains constant over a length $L_3$, and the spoke's lateral extent is terminated with a fillet radius.

As the spoke $42_i$ bends in the XZ plane, surface stress increases linearly with spoke thickness. Therefore, a minimum spoke thickness may be desired to minimize crack propagation, per Equations (8) and (9). However, very thin spokes are more difficult to manufacture than thicker spokes. Recognizing that the spoke extremity may suffer damage (e.g., due to road hazards, rocks, and the like), the cross section of of the spoke $42_i$ addresses this in a creative fashion: the spoke extremity maintains a thick cross section, serving to protect the spoke integrity from damage. Yet, in a case in which the spoke is damaged and a crack occurs, crack propagation along the width of the spoke is inhibited due to the thin cross section occurring immediately inboard of the lateral extent.

For example, in some embodiments, practical values that relate $T_2$ and $T_1$. $T_2$ may be about no more than about 80% the value of $T_1$, preferably about 70% the value of $T_1$. In some cases, $L_1$ is related to spoke thickness $T_1$, with $L_1$=7× $T_1$. L2 can be less than L1. For example, in some cases $L_2$=0.5 $L_1$. $L_3$ may be a small value, per manufacturing factors. $T_3$ can be about equal to $T_1$. The values of all these parameters may be dictated by manufacturing needs; yet, the important aspect for tire performance is that the spoke extremity and the spoke cross section main body are connected by a spoke cross section of reduced thickness. This design feature protects the main spoke body from damage due to crack propagation.

Figure 27:
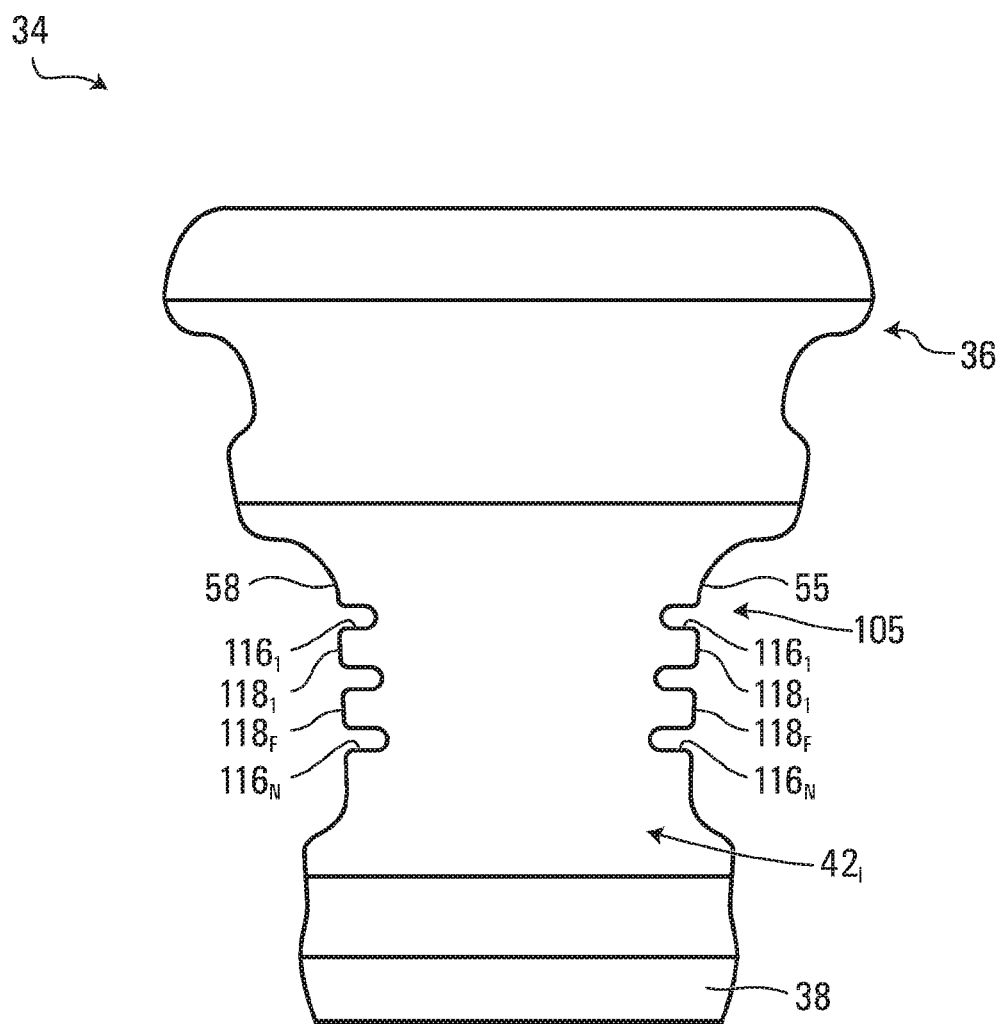
FIG. 27 shows a cross-sectional view of the tire in an example of a variant of the stress reducer of the support member.

For instance, in another example of implementation, with additional reference to FIG. 27, the stress reducer 105 of the lateral end portion $79_x$ of the spoke $42_i$ may comprise recesses $116_1$-$116_N$, in this case notches, distributed along the length of the lateral end portion $79_x$ of the spoke $42_i$. The notches $116_1$-$116_N$ basically act as "controlled cracks" in that the bending stress at the lateral end portion $79_x$ of the spoke $42_i$ is concentrated at the site of each notch $116_i$. Portions of the lateral end portion $79_x$ of the spoke $42_i$ that are free of notches i.e., notch-free portions $118_1$-$118_F$, are therefore subjected to a lower bending stress such that cracks or damaged areas at the notch-free portions $118_1$-$118_F$ do not expand significantly. Each notch $116_i$ is shaped such that the notch $116_i$ itself also does not expand significantly. In particular, a radius of each notch $116_i$ is relatively large such as to minimize expansion of the notch $116_i$.

Figure 28:
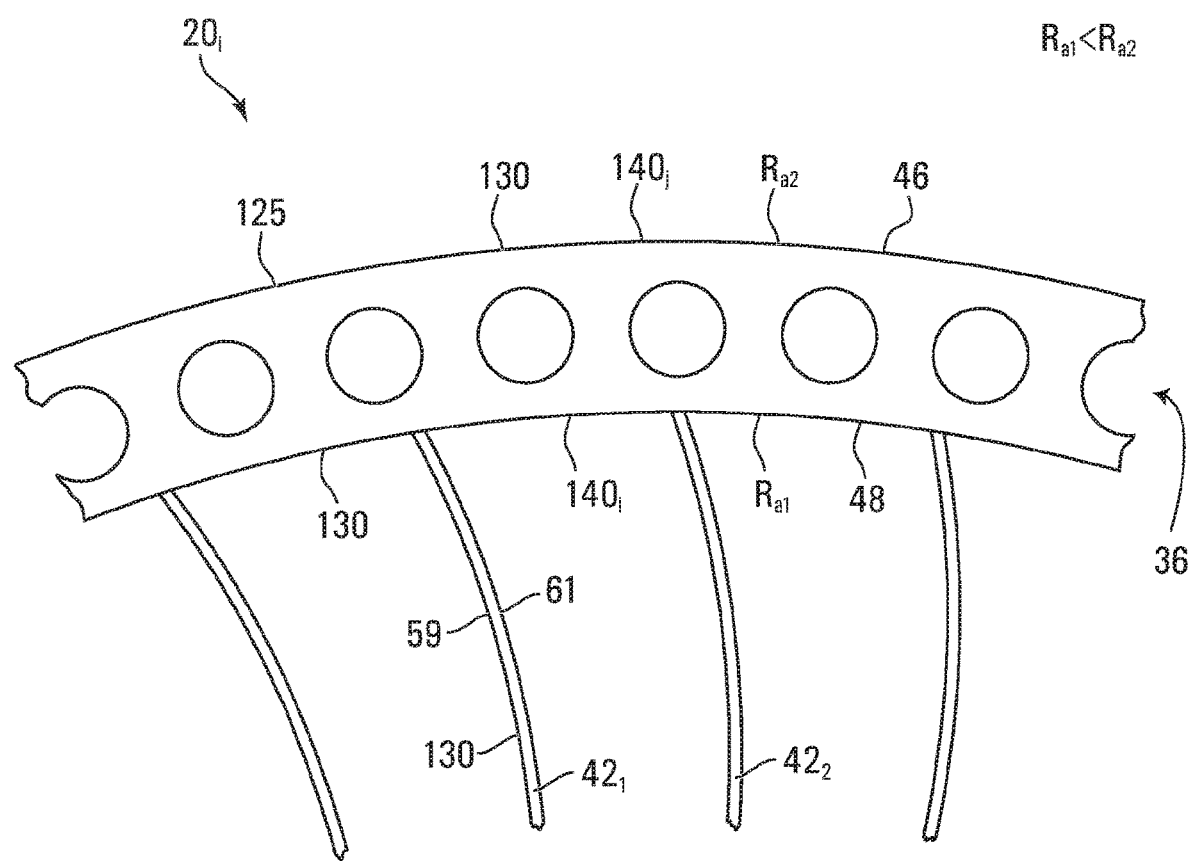
FIG. 28 shows a partial view of the annular beam of the tire in an example of a variant in which surface roughness of the wheel varies throughout portions of a periphery of the wheel.

With additional reference to FIG. 28, asperities on a periphery 125 of the wheel $20_i$ may cause the periphery 125 of the wheel $20_i$ to develop cracks that can potentially propagate and lead to the failure of the wheel $20_i$. Therefore, in some embodiments, a surface roughness of at least part (i.e., part or all) of the periphery 125 of the wheel $20_i$ may be controlled to minimize crack propagation.

More particularly, in some embodiments, the surface roughness $R_a$ of at least part of the periphery 125 of the wheel $20_i$, such as at least part of a periphery 130 of the tire 34, may not exceed a threshold surface roughness. For example, in some embodiments, the surface roughness $R_a$ of at least part of the periphery 125 of the wheel $20_i$, such as at least part of the periphery 130 of the tire 34, may be no more than 2 µm, in some cases no more than 1.5 µm, in some cases no more than 1 µm, in some cases no more than 0.5 µm, and in some cases even less.

For instance, in some embodiments, the surface roughness $R_a$ of the inner peripheral surface 48 of the annular beam 36 of the tire 34 may not exceed the threshold surface roughness. Alternatively or additionally, in some embodiments, the surface roughness $R_a$ of each of the first and second surface faces 59, 61 of the spokes $42_1$-$42_T$ may not exceed the threshold surface roughness. In some embodiments, the surface roughness $R_a$ of all surfaces of the tire 34 may not exceed the threshold surface roughness.

In some embodiments, the surface roughness $R_a$ of a portion $140_i$ of the periphery 125 of the wheel $20_i$ that is more susceptible to crack propagation may be less than the surface roughness $R_a$ of another portion $140_j$ of the periphery 125 of the wheel $20_i$ that is less susceptible to crack propagation. For instance, the portion $140_i$ of the periphery 125 of the wheel $20_i$ that is more susceptible to crack propagation may experience more tensile loading than the portion $140_j$ of the periphery 125 of the wheel $20_i$ that experiences less tensile loading as the wheel $20_i$ is in use. For example, a ratio of the surface roughness $R_a$ of the portion $140_i$ of the periphery 125 of the wheel $20_i$ that is more susceptible to crack propagation over the surface roughness $R_a$ of the portion $140_j$ of the periphery 125 of the wheel $20_i$ that is less susceptible to crack propagation may be no more than 0.9, in some cases no more than 0.8, in some cases no more than 0.7, and in some cases even less (e.g., no more than 0.5, 0.4 or 0.3).

For example, in some embodiments, as shown in FIG. 28, the portion $140_i$ of the periphery 125 of the wheel $20_i$ may include the inner peripheral surface 48 of the annular beam 36 of the tire 34 and the portion $140_j$ of the periphery 125 of the wheel $20_i$ may include the outer peripheral surface 46 of the annular beam 36 of the tire 34 such that the surface roughness $R_a$ of the inner peripheral surface 48 of the annular beam 36 of the tire 34 is less than the surface roughness $R_a$ of the outer peripheral surface 46 of the annular beam 36 of the tire 34. As another example, in some embodiments, the portion $140_i$ of the periphery 125 of the wheel $20_i$ may include each of the first and second surface faces 59, 61 of the spokes $42_1$-$42_T$ and the portion $140_j$ of the periphery 125 of the wheel $20_i$ may include the outer peripheral surface 46 of the annular beam 36 of the tire 34 such that the surface roughness $R_a$ of each of the first and second surface faces 59, 61 of the spokes $42_1$-$42_T$ is less than the surface roughness $R_a$ of the outer peripheral surface 46 of the annular beam 36 of the tire 34.

The surface roughness $R_a$ of at least part of the periphery 125 of the wheel $20_i$ may be limited in various ways.

Notably, the surface roughness $R_a$ of at least part of the periphery 125 of the wheel $20_i$, (e.g., the inner peripheral surface 48 of the annular beam 36 of the tire 34) may be limited by a manufacturing process used in production of the wheel $20_i$. For example, in some embodiments, the surface roughness $R_a$ of at least part of the periphery 125 of the wheel $20_i$ may be achieved during molding of that part of the wheel $20_i$ using a mold having a suitable surface finish. As another example, in some embodiments, the manufacturing process may involve a post-molding finishing process (e.g., polishing or mold coating with silicone or chrome) to reduce the surface roughness of that part of the wheel $20_i$.

3. Reinforced Annular Beam

In some embodiments, the annular beam 36 may comprise one or more reinforcing layers running in the circumferential direction of the wheel $20_i$ to reinforce the annular beam 36, such as one or more substantially inextensible reinforcing layers running in the circumferential direction of the wheel $20_i$ (e.g., one or more layers of metal, composite (e.g., carbon fibers, other fibers), and/or another material that is substantially inextensible running in the circumferential direction of the wheel $20_i$). For instance, this may reinforce the annular beam 36 by protecting it against cracking and/or by better managing heat generated within it as it deforms in use.

Figure 29:
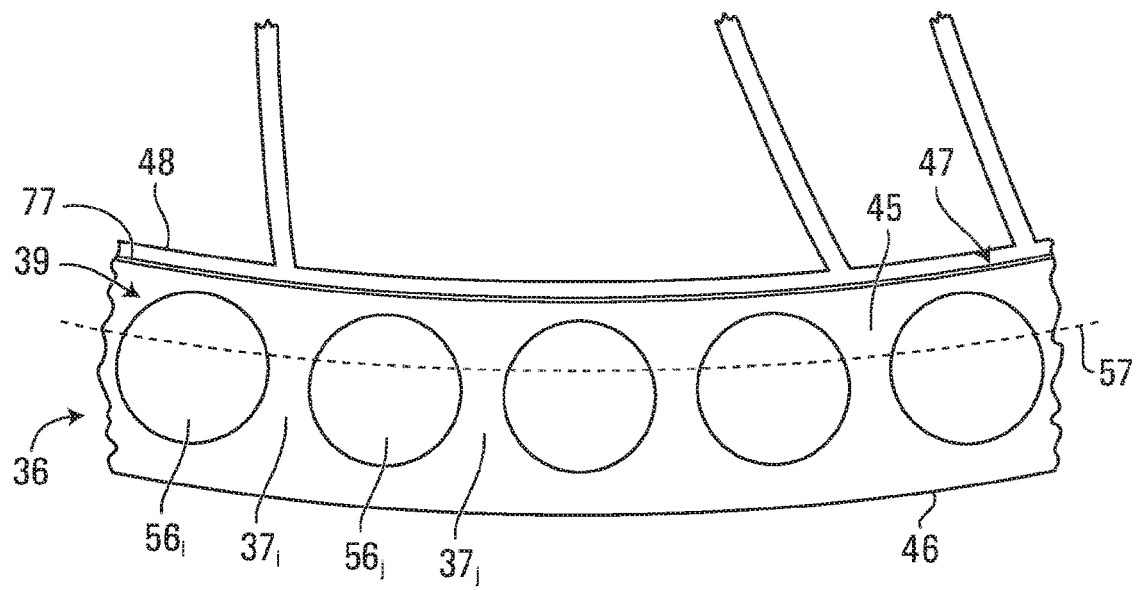
FIG. 29 shows an example of an embodiment in which the annular beam comprises a reinforcing layer.

For example, in some embodiments, as shown in FIG. 29, the annular beam 36 may comprise a reinforcing layer 47 running in the circumferential direction of the wheel $20_i$.

The reinforcing layer 47 is unnecessary for the annular beam 36 to deflect predominantly by shearing, i.e., unnecessary for the shear band 39 to deflect significantly more by shearing than by bending at the contact patch 25 of the wheel $20_i$. That is, the annular beam 36 would deflect predominantly by shearing even without the reinforcing layer 47. In other words, the annular beam 36 would deflect predominantly by shearing if it lacked the reinforcing layer 47 but was otherwise identical. Notably, in this embodiment, this is due to the openings $56_1$-$56_N$ and the interconnecting members $37_1$-$37_P$ of the shear band 39 that facilitate deflection predominantly by shearing.

The annular beam 36 has the reinforcing layer 47 but is free of any equivalent reinforcing layer running in the circumferential direction of the wheel $20_i$ and spaced from the reinforcing layer 47 in the radial direction of the wheel $20_i$. That is, the annular beam 36 has no reinforcing layer that is equivalent, i.e., identical or similar in function and purpose, to the reinforcing layer 47 and spaced from the reinforcing layer 47 in the radial direction of the wheel $20_i$. The annular beam 36 therefore lacks any reinforcing layer that is comparably stiff to (e.g., within 10% of a stiffness of) the reinforcing layer 47 in the circumferential direction of the wheel $20_i$ and spaced from the reinforcing layer 47 in the radial direction of the wheel $20_i$.

In this embodiment, the annular beam 36 has the reinforcing layer 47 but is free of any substantially inextensible reinforcing layer running in the circumferential direction of the wheel $20_i$ and spaced from the reinforcing layer 47 in the radial direction of the wheel $20_i$. Thus, the reinforcing layer 47 is a sole reinforcing layer of the annular beam 36.

More particularly, in this embodiment, the annular beam 36 has the reinforcing layer 47 located on a given side of a neutral axis 57 of the annular beam 36 and is free of any substantially inextensible reinforcing layer running in the circumferential direction of the wheel $20_i$ on an opposite side of the neutral axis 57 of the annular beam 36. That is, the reinforcing layer 47 is located between the neutral axis 57 of the annular beam 36 and a given one of the inner peripheral extent 48 and the outer peripheral extent 46 of the annular beam 36 in the radial direction of the wheel $20_i$, while the annular beam 36 is free of any substantially inextensible reinforcing layer running in the circumferential direction of the wheel $20_i$ between the neutral axis 57 of the annular beam 36 and the other one of the inner peripheral extent 48 and the outer peripheral extent 46 of the annular beam 36 in the radial direction of the wheel $20_i$.

The neutral axis 57 of the annular beam 36 is an axis of a cross-section of the annular beam 36 where there is substantially no tensile or compressive stress in the circumferential direction of the wheel $20_i$ when the annular beam 36 deflects at the contact patch 25 of the wheel $20_i$. In this example, the neutral axis 57 is offset from a midpoint of the annular beam 36 between the inner peripheral extent 48 and the outer peripheral extent 46 of the annular beam 36 in the radial direction of the wheel $20_i$. More particularly, in this example, the neutral axis 57 is closer to a given one of the inner peripheral extent 48 and the outer peripheral extent 46 of the annular beam 36 than to an opposite one of the inner peripheral extent 48 and the outer peripheral extent 46 of the annular beam 36 in the radial direction of the wheel $20_i$.

In this embodiment, the reinforcing layer 47 is disposed radially inwardly of the neutral axis 57 of the annular beam 36, and the annular beam 36 is free of any substantially inextensible reinforcing layer running in the circumferential direction of the wheel $20_i$ radially outwardly of the neutral axis 57 of the annular beam 36.

In this example, the reinforcing layer 47 is disposed between the inner peripheral extent 48 of the annular beam 36 and the openings $56_1$-$56_N$ in the radial direction of the wheel $20_i$, while the annular beam 36 is free of any substantially inextensible reinforcing layer running in the circumferential direction of the wheel $20_i$ between the outer peripheral extent 46 of the annular beam 36 and the openings $56_1$-$56_N$ in the radial direction of the wheel $20_i$.

The reinforcing layer 47 may be implemented in any suitable way in various embodiments.

Figure 30:
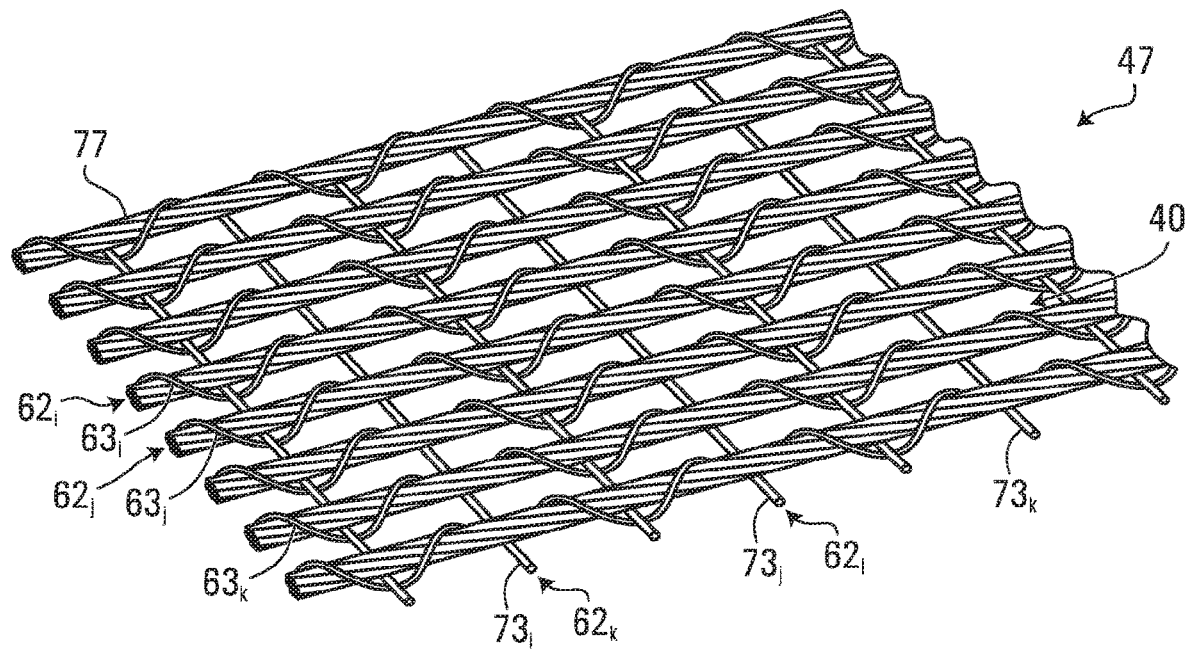
FIG. 30 shows an example of an embodiment of the reinforcing layer.

For example, in some embodiments, as shown in FIG. 30, the reinforcing layer 47 may include a layer of elongate reinforcing elements $62_1$-$62_E$ that reinforce the annular beam 36 in one or more directions in which they are elongated, such as the circumferential direction of the wheel $20_i$ and/or one or more directions transversal thereto.

For instance, in some embodiments, the elongate reinforcing elements $62_1$-$62_E$ of the reinforcing layer 47 may include reinforcing cables $63_1$-$63_C$ that are adjacent and generally parallel to one another. For instance, the reinforcing cables $63_1$-$63_C$ may extend in the circumferential direction of the wheel $20_i$ to enhance strength in tension of the annular beam 36 along the circumferential direction of the wheel $20_i$. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material).

Figure 31:
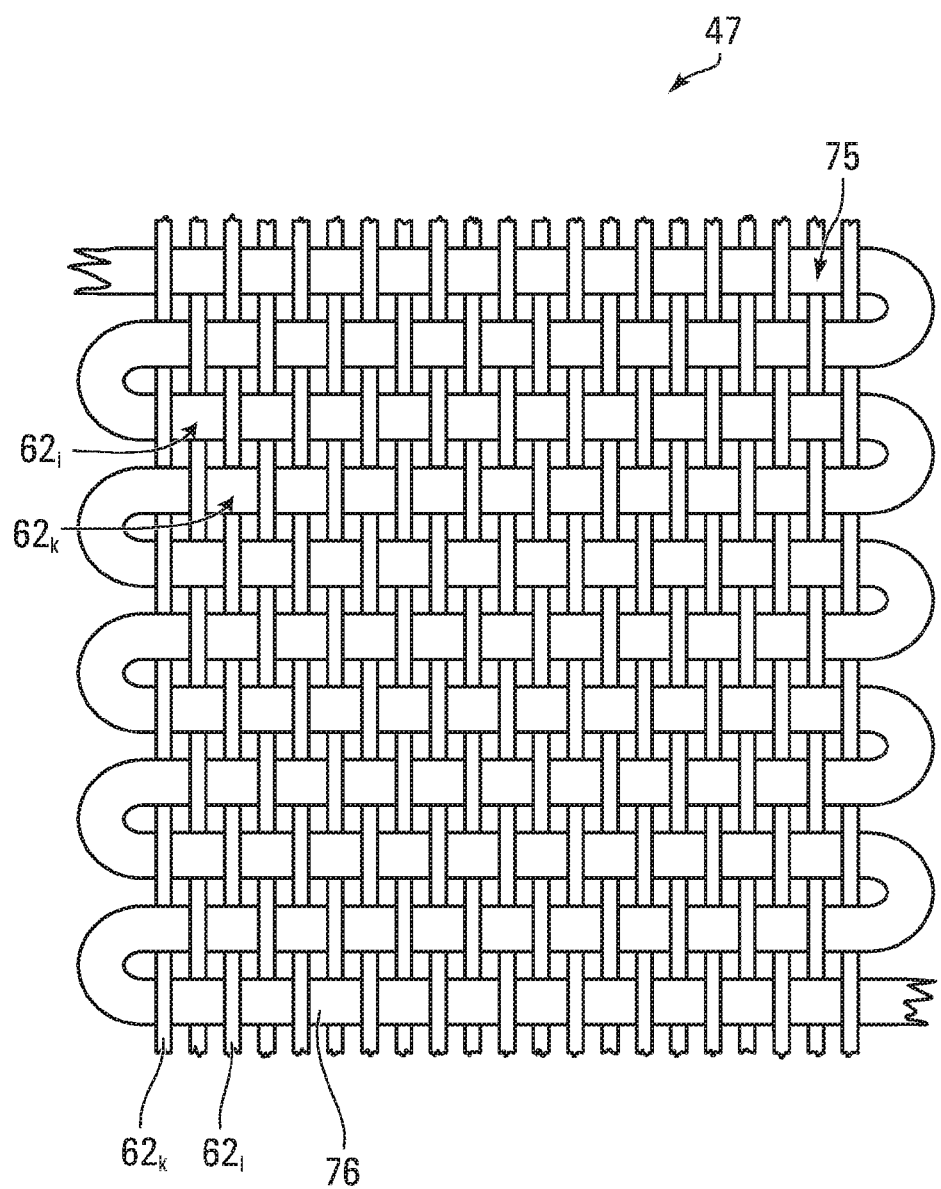
FIG. 31 shows an example of another embodiment of the reinforcing layer.

In some embodiments, the elongate reinforcing elements $62_1$-$62_E$ of the reinforcing layer 47 may include constitute a layer of reinforcing fabric 65. Reinforcing fabric comprises pliable material made usually by weaving, felting, knitting, interlacing, or otherwise crossing natural or synthetic elongated fabric elements, such as fibers, filaments, strands and/or others. For instance, as one example, in some embodiments such as that of FIG. 30, the elongate reinforcing elements $62_1$-$62_E$ of the reinforcing layer 47 that include the reinforcing cables $63_1$-$63_C$ may also include transversal fabric elements $73_1$-$73_T$ that extend transversally (e.g., perpendicularly) to and interconnect the reinforcing cables $63_1$-$63_C$. Thus, in this example, the reinforcing layer 47, including its reinforcing cables $63_1$-$63_C$ and its transversal fabric elements $73_1$-$73_T$, can be viewed as a reinforcing fabric or mesh (e.g., a "tire cord" fabric or mesh). As another example, in some embodiments, as shown in FIG. 31, the reinforcing fabric 47 may include textile 75 (e.g., woven or nonwoven textile).

In other examples of implementation, the reinforcing layer 47 may include a reinforcing sheet (e.g., a thin, continuous layer of metallic material, such as steel or aluminum that extends circumferentially).

The reinforcing layer 47 may be made of one or more suitable materials. A material 77 of the reinforcing layer 47 may be stiffer and stronger than the elastomeric material 45 of the annular beam 36 in which it is disposed. For instance, in some embodiments, the material 77 of the reinforcing layer 47 may be a metallic material (e.g., steel, aluminum, etc.). In other embodiments, the material 77 of the reinforcing layer 47 may be a stiff polymeric material, a composite material (e.g., a fiber-reinforced composite material), etc.

In this example of implementation, the reinforcing layer 47 comprises the reinforcing mesh or fabric that includes the reinforcing cables $63_1$-$63_C$ and the transversal fabric elements $73_1$-$73_T$ which are respectively 3 strands of steel wire of 0.28 mm diameter, wrapped together to form a cable, and high tenacity nylon cord of 1400×2.

In some embodiments, the reinforcing layer 47 may allow the elastomeric material 45 (e.g., PU) of the annular beam 36 to be less stiff, and this may facilitate processability in manufacturing the tire 34. For example, in some embodiments, the modulus of elasticity (e.g., Young's modulus) of the elastomeric material 45 of the annular beam 36 may be no more than 200 MPa, in some cases no more than 150 MPa, in some cases no more than 100 MPa, in some cases no more than 50 MPa, and in some cases even less.

The reinforcing layer 47 may be provided in the annular beam 36 in any suitable way. In this embodiment, the reinforcing layer 47 may be formed as a hoop and placed in the mold before the elastomeric material 45 of the tire 34 is introduced in the mold. As the elastomeric material 45 is distributed within the mold via the centrifugal force generated by the mold's rotation, the reinforcing layer 47 is embedded in that portion of the elastomeric material 45 that forms the annular beam 36.

The reinforcing layer 47 may provide various benefits to the wheel $20_i$ in various embodiments.

For example, in this embodiment, the reinforcing layer 47 may help to protect the annular beam 36 against cracking. More particularly, in this embodiment, as it reinforces the annular beam 36 proximate to the inner peripheral extent 48 of the annular beam 36 that experiences tensile stresses when the annular beam 36 deflects in use, the reinforcing layer 47 may help the annular beam 36 to better withstand these tensile stresses that could otherwise increase potential for cracking to occur in the elastomeric material 45 of the annular beam 36.

As another example, in this embodiment, the reinforcing layer 47 may help to better manage heat generated within the annular beam 36 as it deforms in use. A thermal conductivity of the material 77 of the reinforcing layer 47 may be greater than a thermal conductivity of the elastomeric material 45 of the annular beam 36, such that the reinforcing layer 47 can better conduct and distribute heat generated within the tire 34 as it deforms in use. This may allow a highest temperature of the elastomeric material 45 to remain lower and therefore allow the wheel $20_i$ to remain cooler and/or run faster at a given load than if the reinforcing layer 47 was omitted.

More particularly, in this embodiment, a ratio of the thermal conductivity of the material 77 of the reinforcing layer 47 over the thermal conductivity of the elastomeric material 45 of the annular beam 36 may be at least 50, in some cases at least 75, in some cases at least 100, and in some cases even more. For instance, in some embodiments, the thermal conductivity of the material 77 of the reinforcing layer 47 may be at least 10 W/m/° C., in some cases at least at least 20 W/m/° C., in some cases at least 30 W/m/° C., in some cases at least 40 W/m/° C., and in some cases even more.

A thermal conductivity of a unidirectional composite layer can be calculated by the following equation:

$$K_i = V_c K_c + (1-V_c) K_m \quad (10)$$

Where: $K_i$=thermal conductivity of the ply in direction i
$V_C$=cable volume fraction in direction i
$K_C$=cable thermal conductivity
$K_M$=matrix thermal conductivity From Equation (10) the thermal conductivity of a composite is orthotropic; i.e., it is different in different directions. The tire designer can thus tune the composite layer to have the desired conductivity in the circumferential direction (say, the "1" direction) independently of the lateral direction (say, the "2") direction.

Most elastomers, such as rubber and polyurethane, are good thermal insulators. The inventors have found that even a fairly low cable volume fraction is sufficient to raise the thermal conductivity to a level that adequately evacuates heat. With a steel cable, Equation (10) shows that a cable volume fraction of 0.10 gives a composite layer thermal conductivity of 5.2 W/m/° C. This value, or even a value as low as 2.0 W/m/° C. may be sufficient to improve thermal performance.

In some embodiments, steel may be used as the reinforcing material in both the circumferential and lateral directions. For example, to better dissipate heat and homogenize temperature, a steel cable of 3 strands of 0.28 mm diameter at a pace of 1.8 mm could be used in both the vertical and lateral directions. Such a composite layer has an average thickness of about 1.0 mm, and a steel volume fraction of about 0.10 in both vertical and lateral directions. As previously stated, this yields a thermal conductivity of about 5.2 W/m/° C. for the composite layer.

Figure 32:
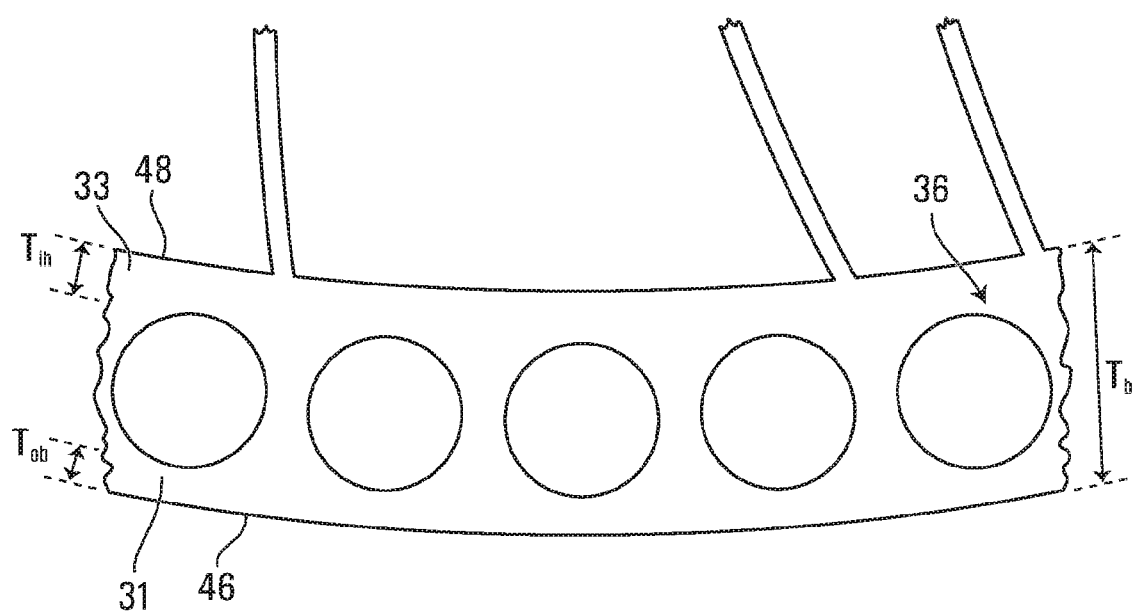
FIG. 32 shows an example of an embodiment in which a thickness of the annular beam is increased.

In some embodiments, in addition to or instead of including the reinforcing layer 47, as shown in FIG. 32, a thickness $T_b$ of the annular beam 36 in the radial direction of the wheel 20$_i$ may be increased in order to reinforce the annular beam 36. More particularly, in this embodiment, the inner rim 33 may be increased in thickness. For instance, the inner rim 33 of the annular beam 36 may be thicker than the outer rim 31 of the annular beam 36 in the radial direction of the wheel 20$_i$. This may help the annular beam 36 to better withstand tensile stresses proximate to the inner peripheral extent 48 of the annular beam 36 when the annular beam 36 deflects in use.

For example, in this embodiment, a ratio of a thickness $T_b$ of the annular beam 36 in the radial direction of the wheel 20$_i$ over the outer diameter $D_W$ of the wheel 20$_i$ may be at least 0.05, in some cases at least 0.07, in some cases as least 0.09, and in some cases even more.

As another example, in this embodiment, a ratio of a thickness $T_{ib}$ of the inner rim 33 of the annular beam 36 in the radial direction of the wheel 20$_i$ over a thickness $T_{ob}$ of the outer rim 31 of the annular beam 36 in the radial direction of the wheel 20$_i$ may be at least 1.2, in some cases at least 1.4, in some cases as least 1.6, and in some cases even more.

While in embodiments considered above the wheel 20$_i$ is part of the construction vehicle 10, a wheel constructed according to principles discussed herein may be used as part of other vehicles or other devices in other embodiments.

Figure 33:
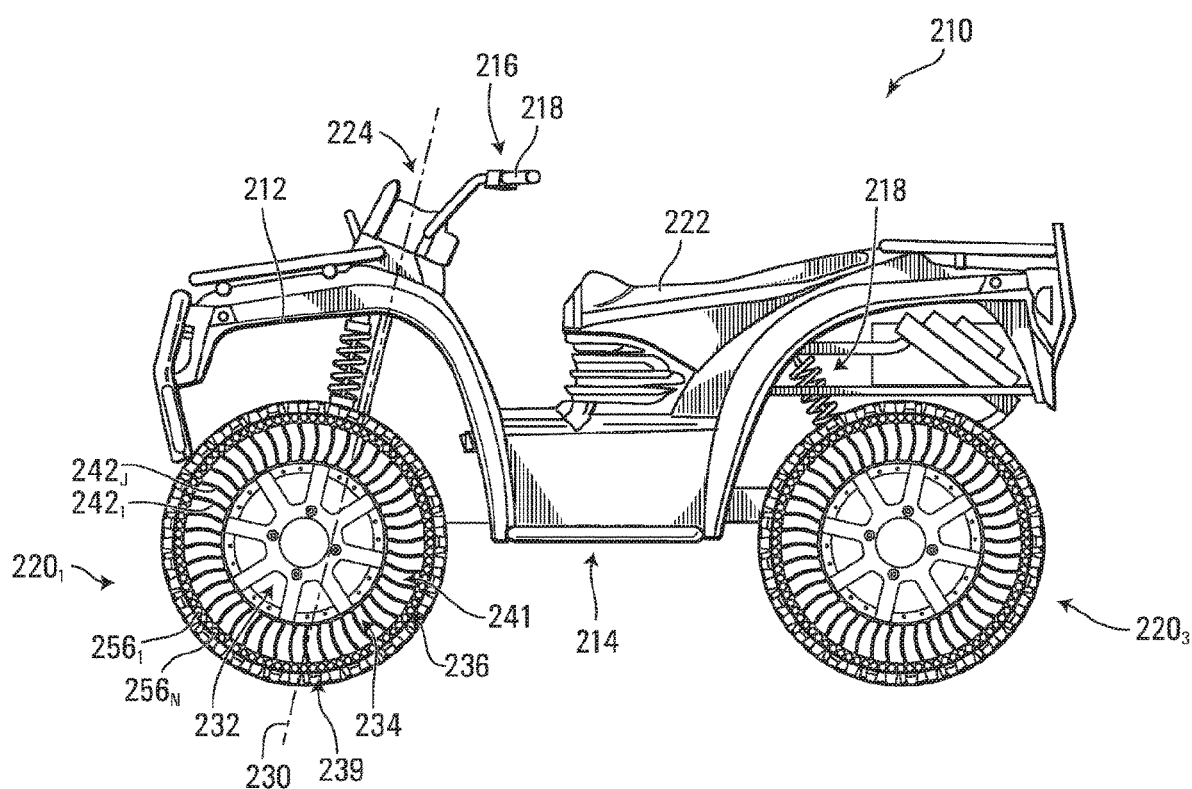
FIGS. 33 and 34 show an example of another vehicle comprising wheels comprising non-pneumatic tires in accordance with another embodiment of the invention.
Figure 34:
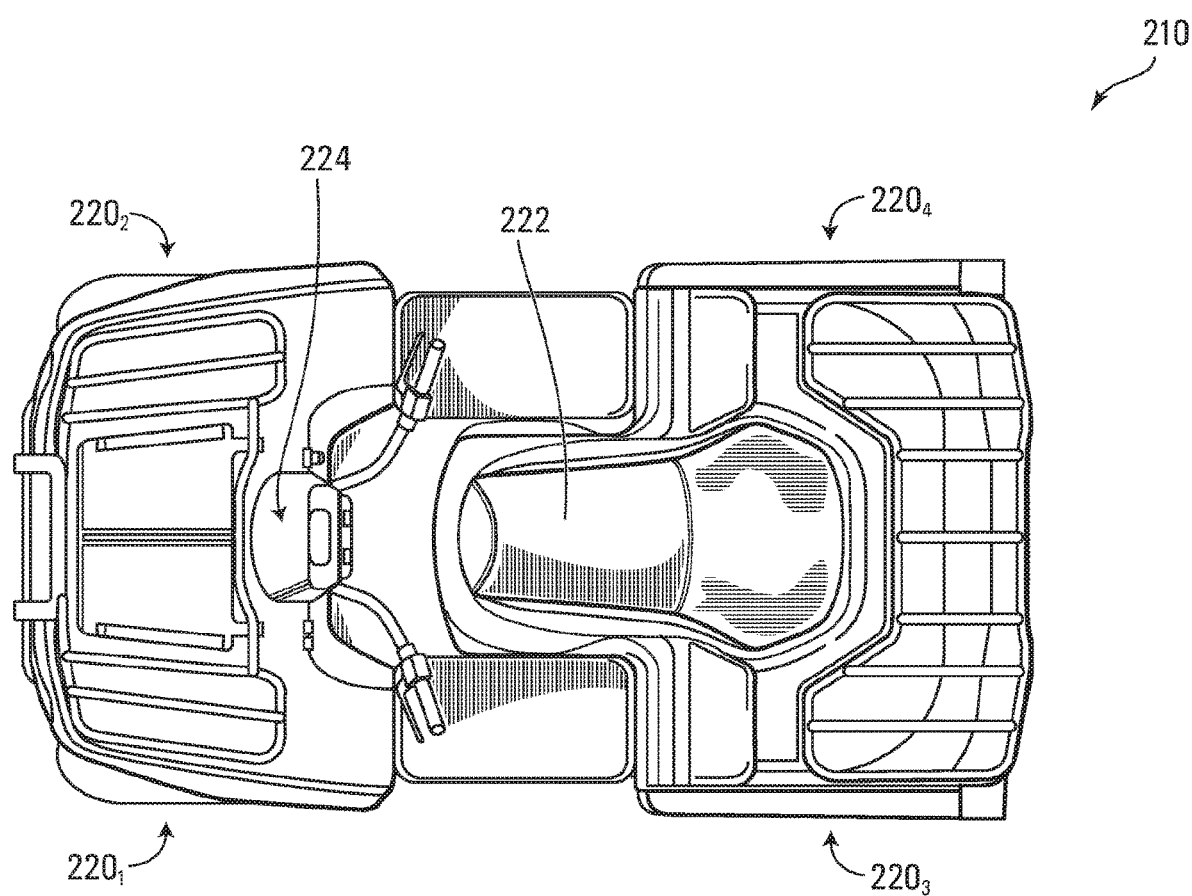
Figure 35:
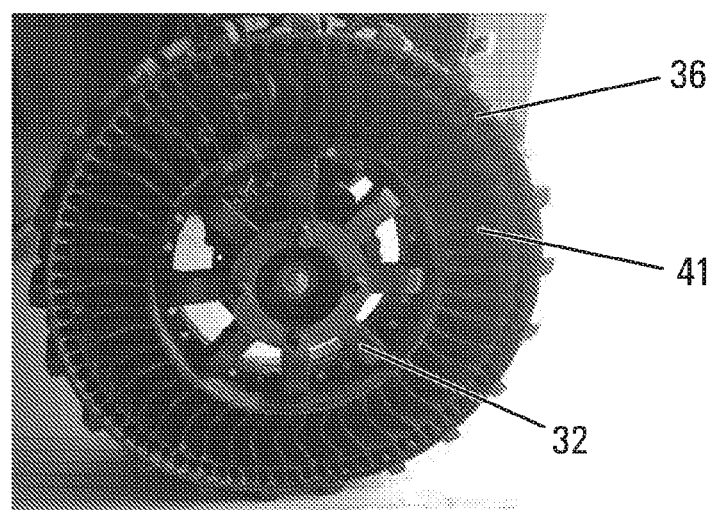
FIG. 35 shows an example of an embodiment of a tire of the vehicle of FIGS. 33 and 34.

For example, with additional reference to FIGS. 33 and 34, in some embodiments, an all-terrain vehicle (ATV) 210 may comprise wheels 220$_1$-220$_4$ constructed according to principles discussed herein in respect of the wheel 20$_i$. The ATV 210 is a small open vehicle designed to travel off-road on a variety of terrains, including roadless rugged terrain, for recreational, utility and/or other purposes. In this example, the ATV 210 comprises a frame 212, a powertrain 214, a steering system 216, a suspension 218, the wheels 220$_1$-220$_4$, a seat 222, and a user interface 224, which enable a user of the ATV 210 to ride the ATV 210 on the ground.

The steering system 216 is configured to enable the user to steer the ATV 210 on the ground. To that end, the steering system 216 comprises a steering device 228 that is operable by the user to direct the ATV 210 along a desired course on the ground. In this embodiment, the steering device 228 comprises handlebars. The steering device 228 may comprise a steering wheel or any other steering component that can be operated by the user to steer the ATV 210 in other embodiments. The steering system 216 responds to the user interacting with the steering device 228 by turning respective ones of the wheels 220$_1$-220$_4$ to change their orientation relative to the frame 212 of the ATV 210 in order to cause the ATV 210 to move in a desired direction. In this example, front ones of the wheels 220$_1$-220$_4$ are turnable in response to input of the user at the steering device 228 to change their orientation relative to the frame 212 of the ATV 210 in order to steer the ATV 210 on the ground. More particularly, in this example, each of the front ones of the wheels 220$_1$-220$_4$ is pivotable about a steering axis 230 of the ATV 210 in response to input of the user at the steering device 228 in order to steer the ATV 210 on the ground. Rear ones of the wheels 220$_1$-220$_4$ are not turned relative to the frame 212 of the ATV 210 by the steering system 216.

The suspension 218 is connected between the frame 212 and the wheels 220$_1$-220$_4$ to allow relative motion between the frame 122 and the wheels 220$_1$-220$_4$ as the ATV 210 travels on the ground. For example, the suspension 218 enhances handling of the ATV 210 on the ground by absorbing shocks and helping to maintain traction between the wheels 20$_1$-20$_4$ and the ground. The suspension 218 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

In this embodiment, the seat 222 is a straddle seat and the ATV 210 is usable by a single person such that the seat 222 accommodates only that person driving the ATV 210. In other embodiments, the seat 222 may be another type of seat, and/or the ATV 210 may be usable by two individuals, namely one person driving the ATV 210 and a passenger, such that the seat 222 may accommodate both of these individuals (e.g., behind one another or side-by-side) or the ATV 210 may comprise an additional seat for the passenger.

For example, in other embodiments, the ATV 210 may be a side-by-side ATV, sometimes referred to as a "utility terrain vehicle" or "utility task vehicle" (UTV).

The wheels $220_1$-$220_4$ engage the ground to provide traction to the ATV 210. More particularly, in this example, the front ones of the wheels $220_1$-$220_4$ provide front traction to the ATV 10 while the rear ones of the wheels $220_1$-$220_4$ provide rear traction to the ATV 10.

Each wheel $220_i$ of the ATV 210 may be constructed according to principles described herein in respect of the wheels $20_1$-$20_4$, notably by comprising a non-pneumatic tire 234 and a hub 232 that may be constructed according to principles described herein in respect of the non-pneumatic tire 34 and the hub 32. The non-pneumatic tire 234 comprises an annular beam 236 and an annular support 241 that may be constructed according principles described herein in respect of the annular beam 36 and the annular support 41. For instance, the annular beam 236 comprises a shear band 239 comprising openings $256_1$-$256_B$ and the annular support 41 comprises spokes $242_1$-$242_j$ that may be constructed according to principles described herein in respect of the shear band 39 and the spokes $42_1$-$42_T$.

Figure 36:
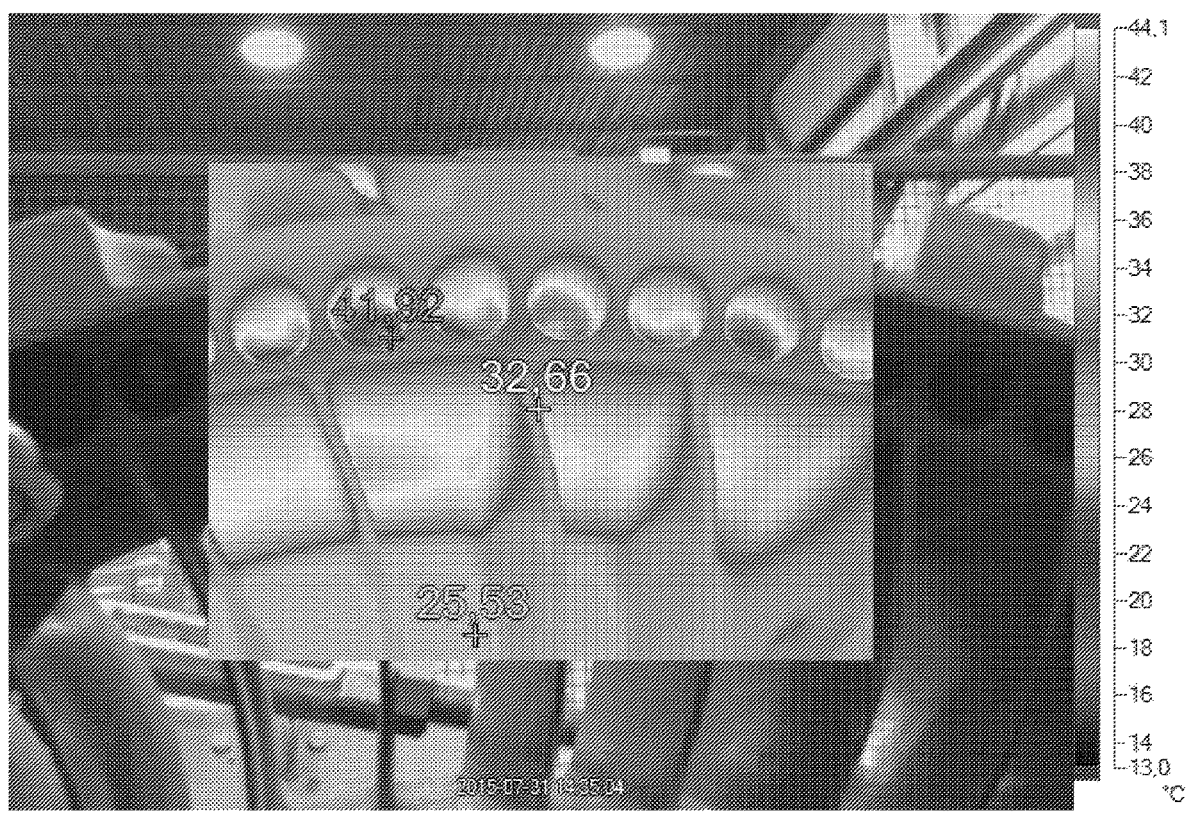
FIG. 36 shows a thermal image of the tire of FIG. 31.

FIG. 31 shows an example of an embodiment of the tire 234. This tire has an OD of 680 mm (27") and a width of 225 mm (9"). It is designed for a load capacity of 300 kgf at 60 kph. The mass of this tire is about 17 kg, which is competitive with the mass of a pneumatic tire and steel wheel of the same size. In this example, the 27"×9" tire has an $R_{VS}$=3.6 mm$^3$/mm$^2$ and a maximum wall thickness of 6 mm. FIG. 36 shows a thermal image of this tire, loaded to 250 kgf, rolling at 50 kph, with ambient temperature of 26 C. The results are consistent with modeling methodology and results previously disclosed for tires in the construction market segment. FIG. 32 shows temperatures in the webbing holes of about 42 C. This is only 16 C hotter than ambient temperature. Maximum temperature within the structure walls is about 50 C—well within material limits.

Figure 37:
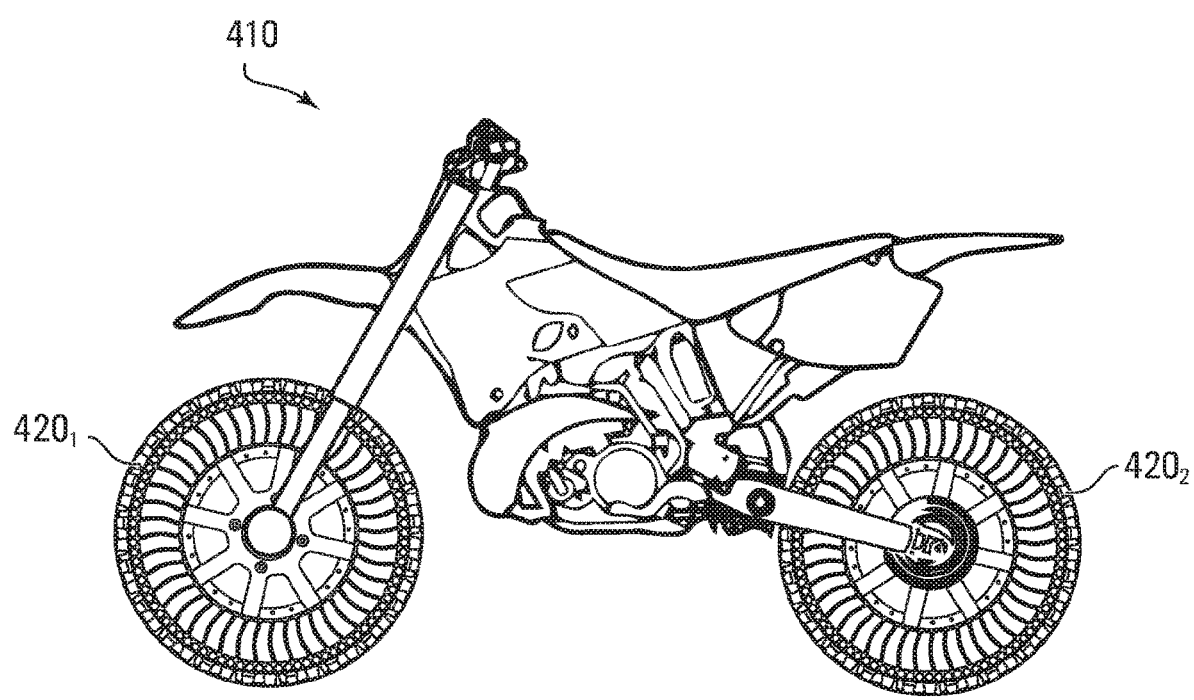
FIG. 37 shows an example of another vehicle comprising wheels comprising non-pneumatic tires in accordance with another embodiment of the invention.

As another example, in some embodiments, with additional reference to FIG. 37, a motorcycle 410 may comprise a front wheel $420_1$ and a rear wheel $420_2$ constructed according to principles discussed herein in respect of the wheel $20_i$.

As another example, in some embodiments, a wheel constructed according to principles discussed herein in respect of the wheel $20_i$ may be used as part of an agricultural vehicle (e.g., a tractor, a harvester, etc.), a material-handling vehicle, a forestry vehicle, or a military vehicle.

As another example, in some embodiments, a wheel constructed according to principles discussed herein in respect of the wheel $20_i$ may be used as part of a road vehicle such as an automobile or a truck.

As another example, in some embodiments, a wheel constructed according to principles discussed herein in respect of the wheel $20_i$ may be used as part of a lawnmower (e.g., a riding lawnmower or a walk-behind lawnmower).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A non-pneumatic tire for a wheel, the non-pneumatic tire comprising:
 an annular beam comprising a plurality of openings distributed in a circumferential direction of the non-pneumatic tire, the plurality of openings extend from a first lateral side of the non-pneumatic tire to a second lateral side of the non-pneumatic tire, configured to deflect at a contact patch of the non-pneumatic tire; and
 an annular support disposed radially inwardly of the annular beam and configured to resiliently deform as the wheel engages the ground;
 wherein a ratio of a volume of the annular beam over a surface area of the annular beam is no more than 12 mm$^3$/mm$^2$; for which:
 said volume is a volume bounded by an outer peripheral extent, an inner peripheral extent, and the first lateral side, and the second lateral side of the annular beam, minus a cumulative volume of the openings; and
 said surface area is an area of the outer peripheral extent, the inner peripheral extent, and from the inner peripheral extent to the outer peripheral extent minus area of the openings of the first lateral side and second lateral side, plus the cumulative surface area of the annular beam that defines the openings from a first lateral side to a second lateral side;
 and the annular beam comprises elastomeric material having a tan(delta) of no more than 0.1 when tested at 4% strain, 10 HZ, and 50° C.

2. The non-pneumatic tire of claim 1, wherein the ratio of the volume of the annular beam over the surface area of the annular beam is no more than 10 mm$^3$/mm$^2$.

3. The non-pneumatic tire of claim 1, wherein the ratio of the volume of the annular beam over the surface area of the annular beam is no more than 6 mm$^3$/mm$^2$.

4. The non-pneumatic tire of claim 1, wherein a ratio of a volume of the annular beam and the annular support over a surface area of the annular beam and the annular support is no more than 15 mm$^3$/mm$^2$.

5. The non-pneumatic tire of claim 1, wherein a ratio of a volume of the annular beam and the annular support over a surface area of the annular beam and the annular support is no more than 10 mm$^3$/mm$^2$.

6. The non-pneumatic tire of claim 1, wherein a ratio of a maximal wall thickness of the annular beam and the annular support over a diameter of the wheel is no more than 5%.

7. The non-pneumatic tire of claim 1, wherein a ratio of a maximal wall thickness of the annular beam and the annular support over a diameter of the wheel is no more than 2.5%.

8. The non-pneumatic tire of claim 1, wherein a ratio of a design load of the wheel over a mass of the wheel is at least 15.

9. The non-pneumatic tire of claim 1, wherein the annular beam is configured to deflect more by shearing than by bending at the contact patch of the non-pneumatic tire.

10. The non-pneumatic tire of claim 1, wherein the annular support is resiliently deformable such that, when the non-pneumatic tire is loaded, a lower portion of the annular support below an axis of rotation of the non-pneumatic tire is compressed and an upper portion of the annular support above the axis of rotation of the non-pneumatic tire is in tension.

11. The non-pneumatic tire of claim 1, wherein the annular support comprises a plurality of spokes.

12. The non-pneumatic tire of claim 1, wherein an openness factor of the annular beam is at least 0.4.

13. The non-pneumatic tire of claim 1, wherein an openness factor of the annular beam is at least 0.5.

14. The non-pneumatic tire of claim 1, wherein a cross-section of each opening varies in an axial direction of the non-pneumatic tire.

15. The non-pneumatic tire of claim 14, wherein the cross-section of the opening defines a constriction of the opening.

16. The non-pneumatic tire of claim 14, wherein the opening tapers inwardly in the axial direction of the non-pneumatic tire towards a central region of the opening and is enlarged outwardly in the axial direction of the non-pneumatic tire towards lateral sides of the wheel.

17. The non-pneumatic tire of claim 1, wherein each opening is configured such that an airflow path within the opening is transversal to an axial direction of the nonpneumatic tire.

18. The non-pneumatic tire of claim 17, wherein the airflow path within the opening is directed at an angle of at least 1° relative to the axial direction of the non-pneumatic tire.

19. The non-pneumatic tire of claim 1, wherein: heat generation of the elastomeric material of the annular beam is no more than 0.07 mW/mm$^3$, when the non-pneumatic tire is traveling at 15 kph at a rated load; and the heat generation is calculated as:

$$\dot{q} = \pi f E' \tan(\delta) \epsilon^2 \quad (1)$$

Where $\dot{q}$=power generation
 f=frequency
 E'=storage modulus
 δ=loss angle
 ε=strain amplitude.

20. The non-pneumatic tire of claim 1, wherein a thermal conductivity of the elastomeric material of the annular beam is no less than 0.27 W/m° C.

21. The non-pneumatic tire of claim 1, further comprising a tread disposed radially outward from the annular beam.

* * * * *